United States Patent
Liss et al.

(10) Patent No.: US 11,284,636 B2
(45) Date of Patent: Mar. 29, 2022

(54) APPARATUS AND METHODS FOR AT LEAST SEMI-AUTONOMOUS MEAL STORAGE AND COOKING

(71) Applicant: Home Tech Innovation, Inc., Cambridge, MA (US)

(72) Inventors: Robin Liss, Cambridge, MA (US); Heather Fisher, Somerville, MA (US); Kevin Incorvia, Los Altos, CA (US)

(73) Assignee: Home Tech Innovation, Inc., Cambridge, MA (US)

( * ) Notice: Subject to any disclaimer, the term of this patent is extended or adjusted under 35 U.S.C. 154(b) by 0 days.

(21) Appl. No.: 17/203,209

(22) Filed: Mar. 16, 2021

(65) Prior Publication Data
US 2021/0195926 A1    Jul. 1, 2021

Related U.S. Application Data

(63) Continuation of application No. 16/133,267, filed on Sep. 17, 2018, now Pat. No. 10,976,097.
(Continued)

(51) Int. Cl.
*A23L 5/10* (2016.01)
*A47J 39/00* (2006.01)
(Continued)

(52) U.S. Cl.
CPC ............. *A23L 5/13* (2016.08); *A23L 3/363* (2013.01); *A23L 5/17* (2016.08); *A47J 27/10* (2013.01);
(Continued)

(58) Field of Classification Search
CPC .... A23L 5/10–5/17; A23L 3/36–3/365; B65D 81/3415; A47J 27/10; A47J 39/006;
(Continued)

(56) References Cited

U.S. PATENT DOCUMENTS

| 590,212 A | 9/1897 | Daesch |
| 734,054 A | 7/1903 | Frost |

(Continued)

FOREIGN PATENT DOCUMENTS

| CA | 2 904 544 A1 | 9/2014 |
| CN | 2452942 Y | 10/2001 |

(Continued)

OTHER PUBLICATIONS

Notice of Reasons for Rejection dated Dec. 24, 2020 for Japanese Application No. 2018-521215, with English translation, 16 pages.
(Continued)

*Primary Examiner* — Drew E Becker
(74) *Attorney, Agent, or Firm* — Cooley LLP

(57) ABSTRACT

A method of using a storage and cooking device having multiple thermal containers includes disposing a first food item in a first thermal container, a second food item in a second thermal container, and a third food item in a third thermal container. A volume of fluid is cooled and circulated through at least a portion of the device such that thermal energy from at least one of the first, second, or third food item is transferred to the cooled fluid. The device is transitioned from a first operating mode to a second operating mode in response to a criterion being satisfied. When in the second configuration, the volume of fluid is heated and circulated through at least a portion of the device such that thermal energy is transferred from the volume of fluid to at least one of the first, second, or third food item.

30 Claims, 14 Drawing Sheets

US 11,284,636 B2
Page 2

Related U.S. Application Data

(60) Provisional application No. 62/615,136, filed on Jan. 9, 2018, provisional application No. 62/559,060, filed on Sep. 15, 2017.

(51) Int. Cl.

| | |
|---|---|
| *A47J 27/10* | (2006.01) |
| *B65D 81/34* | (2006.01) |
| *A23L 3/36* | (2006.01) |
| *A47J 27/18* | (2006.01) |
| *A47J 27/17* | (2006.01) |
| *A47J 37/06* | (2006.01) |
| *F25D 23/12* | (2006.01) |
| *F25D 17/02* | (2006.01) |
| *A47J 27/00* | (2006.01) |
| *A47J 44/00* | (2006.01) |
| *F25D 31/00* | (2006.01) |
| *A47J 27/04* | (2006.01) |

(52) U.S. Cl.
CPC ............ *A47J 27/17* (2013.01); *A47J 27/18* (2013.01); *A47J 37/0629* (2013.01); *A47J 39/006* (2013.01); *B65D 81/3415* (2013.01); *A47J 27/002* (2013.01); *A47J 44/00* (2013.01); *A47J 2027/043* (2013.01); *F25D 17/02* (2013.01); *F25D 23/12* (2013.01); *F25D 31/005* (2013.01)

(58) Field of Classification Search
CPC .... A47J 44/00; A47J 27/002; A47J 2027/043; A47J 27/004; A47J 27/14–27/18; A47J 36/2405; A47J 36/2483–36/2488; A47J 36/26; A47J 36/32–36/321; A47J 37/0629; A47J 37/0641; A47J 37/105; F25D 31/005; F25D 23/12
See application file for complete search history.

(56) References Cited

U.S. PATENT DOCUMENTS

| | | | |
|---|---|---|---|
| 2,097,478 A | 11/1937 | Struble | |
| 2,323,623 A | 7/1943 | Porter | |
| 2,504,794 A * | 4/1950 | Berman | F25D 23/12 165/267 |
| 3,294,548 A * | 12/1966 | Vischer, Jr. | A23L 5/13 426/510 |
| 3,353,476 A * | 11/1967 | Goodman | A47J 37/041 99/328 |
| 3,410,981 A | 11/1968 | Martin | |
| 3,432,642 A * | 3/1969 | Lohr | A47J 27/004 219/439 |
| 3,547,660 A | 12/1970 | Weisberg | |
| 3,608,770 A | 9/1971 | Vincent et al. | |
| 3,819,089 A | 6/1974 | Scales | |
| 3,850,331 A * | 11/1974 | Oxel | A47J 37/06 220/832 |
| 3,888,303 A * | 6/1975 | Skala | F25D 31/005 165/300 |
| 3,946,654 A | 3/1976 | Janssen | |
| 3,983,259 A | 9/1976 | Maior | |
| 4,013,798 A | 3/1977 | Goltsos | |
| 4,084,492 A | 4/1978 | Sullilvan | |
| 4,173,993 A * | 11/1979 | Skala | A47J 27/17 126/400 |
| 4,188,794 A * | 2/1980 | Skala | A47J 27/17 165/232 |
| 4,214,514 A | 7/1980 | Contino et al. | |
| 4,215,629 A | 8/1980 | Janssen | |
| 4,270,598 A | 6/1981 | Britton | |
| 4,505,192 A * | 3/1985 | Dreano | A47J 27/18 99/330 |
| 4,646,628 A | 3/1987 | Lederman | |
| 5,086,693 A * | 2/1992 | Tippmann | A47F 3/001 165/919 |
| 5,094,865 A * | 3/1992 | Levinson | A23L 5/15 219/685 |
| 5,097,759 A | 3/1992 | Vilgrain et al. | |
| 5,123,337 A | 6/1992 | Vilgrain et al. | |
| 5,168,712 A * | 12/1992 | Coelho | A23L 3/36 62/373 |
| 5,174,273 A | 12/1992 | Oiwa | |
| 5,174,274 A | 12/1992 | Oiwa | |
| 5,201,364 A * | 4/1993 | Tippmann | A47J 39/006 126/19 R |
| 5,281,426 A | 1/1994 | Pardo | |
| 5,376,392 A | 12/1994 | Ikegami et al. | |
| 5,421,246 A * | 6/1995 | Tippmann | A23G 7/02 165/918 |
| 5,445,062 A | 8/1995 | Polster | |
| 5,542,344 A | 8/1996 | Koether et al. | |
| 5,990,454 A * | 11/1999 | Westerberg | H05B 3/0076 219/411 |
| 6,085,639 A * | 7/2000 | Dreano | A47J 27/18 165/48.1 |
| 6,244,165 B1 * | 6/2001 | Trombley | F25D 23/12 219/679 |
| 6,262,396 B1 * | 7/2001 | Witt | A47J 37/0623 219/411 |
| 6,414,274 B1 | 7/2002 | Mahyari | |
| 6,447,827 B1 | 9/2002 | Andersen | |
| 6,570,136 B1 * | 5/2003 | Lockwood | F24C 7/082 219/398 |
| 6,588,327 B2 | 7/2003 | Wakabayashi et al. | |
| 7,105,779 B2 * | 9/2006 | Shei | A21B 1/22 219/413 |
| 7,654,194 B2 | 2/2010 | Lagares | |
| 7,757,601 B2 | 7/2010 | Lagares et al. | |
| 8,302,528 B2 | 11/2012 | Pawlick et al. | |
| 8,455,028 B2 | 6/2013 | Breunig et al. | |
| 9,055,756 B2 | 6/2015 | Lambert | |
| 9,095,638 B2 | 8/2015 | Solfa | |
| 9,226,609 B2 | 1/2016 | Romero et al. | |
| 9,285,280 B2 | 3/2016 | Faden | |
| 9,439,530 B2 | 9/2016 | Logan et al. | |
| 9,826,752 B2 | 11/2017 | Cocchi et al. | |
| 10,440,979 B2 * | 10/2019 | Liss | A47J 36/00 |
| 10,798,953 B2 * | 10/2020 | Liss | A23L 5/10 |
| 10,976,097 B2 * | 4/2021 | Liss | A23L 5/17 |
| 11,022,321 B1 * | 6/2021 | Bhogal | A47J 37/0629 |
| 2003/0057206 A1 | 3/2003 | Ishii et al. | |
| 2004/0094532 A1 | 5/2004 | Li | |
| 2004/0121054 A1 | 6/2004 | Berrier et al. | |
| 2005/0072315 A1 | 4/2005 | Romero | |
| 2005/0258171 A1 * | 11/2005 | Witt | H05B 6/6482 219/685 |
| 2006/0251784 A1 * | 11/2006 | Sells | A23L 5/13 426/510 |
| 2007/0012068 A1 | 1/2007 | Kaplan | |
| 2007/0261561 A1 | 11/2007 | Grossbach et al. | |
| 2008/0069485 A1 | 3/2008 | France et al. | |
| 2008/0283440 A1 * | 11/2008 | Hartsfield, Jr. | F25D 31/005 206/557 |
| 2009/0110791 A1 | 4/2009 | Burley et al. | |
| 2010/0021605 A1 * | 1/2010 | Cadoret | A23L 5/13 426/523 |
| 2010/0147159 A1 | 6/2010 | Fossati | |
| 2010/0178402 A1 | 7/2010 | Ippolito et al. | |
| 2010/0255168 A1 | 10/2010 | Roth | |
| 2011/0104349 A1 | 5/2011 | Foser | |
| 2011/0117259 A1 | 5/2011 | Storek et al. | |
| 2011/0195167 A1 | 8/2011 | Sus et al. | |
| 2011/0252813 A1 * | 10/2011 | Veltrop | A47J 39/006 62/3.3 |
| 2012/0251695 A1 | 10/2012 | Neff et al. | |
| 2012/0298655 A1 | 11/2012 | Kamii et al. | |
| 2013/0011537 A1 | 1/2013 | Vahid | |
| 2013/0101720 A1 | 4/2013 | Allaire | |
| 2013/0129892 A1 | 5/2013 | Cadoret et al. | |
| 2013/0224342 A1 | 8/2013 | Peng | |

(56) References Cited

U.S. PATENT DOCUMENTS

| | | |
|---|---|---|
| 2013/0240500 A1 | 9/2013 | Alipour et al. |
| 2013/0264333 A1 | 10/2013 | Alipour et al. |
| 2014/0165644 A1* | 6/2014 | Veltrop ................. F25D 23/003 62/440 |
| 2014/0242232 A1 | 8/2014 | McDonald |
| 2014/0251164 A1 | 9/2014 | Alipour et al. |
| 2014/0260998 A1 | 9/2014 | Pearson |
| 2014/0348989 A1 | 11/2014 | Sloat et al. |
| 2015/0027319 A1* | 1/2015 | Wu ......................... A47J 27/10 99/330 |
| 2015/0064314 A1 | 3/2015 | Manuel et al. |
| 2015/0118362 A1 | 4/2015 | Raczynski |
| 2015/0201749 A1* | 7/2015 | Turner ................... A47B 31/02 62/3.61 |
| 2015/0257404 A1 | 9/2015 | Isenberg et al. |
| 2015/0257574 A1 | 9/2015 | Hoare et al. |
| 2015/0265090 A1 | 9/2015 | Pannella |
| 2015/0272371 A1 | 10/2015 | Gagnon |
| 2015/0289544 A1 | 10/2015 | Ferreira et al. |
| 2015/0313400 A1* | 11/2015 | Hu ........................... A47J 27/18 99/403 |
| 2016/0123660 A1* | 5/2016 | Peng ........................ H05B 3/68 219/623 |
| 2016/0206136 A1 | 7/2016 | Storek et al. |
| 2016/0242594 A1 | 8/2016 | Empl |
| 2016/0379434 A1 | 12/2016 | Huang |
| 2017/0016623 A1 | 1/2017 | Rabie et al. |
| 2017/0027365 A1 | 2/2017 | Ferreira et al. |
| 2017/0036791 A1 | 2/2017 | Infante |
| 2017/0135383 A1* | 5/2017 | Liss ........................ A23L 3/364 |
| 2017/0238750 A1 | 8/2017 | Liss et al. |
| 2018/0058699 A1 | 3/2018 | Hessenauer et al. |
| 2019/0045965 A1 | 2/2019 | Liss et al. |
| 2019/0086143 A1 | 3/2019 | Liss et al. |
| 2019/0104879 A1 | 4/2019 | Howitt |
| 2019/0110640 A1* | 4/2019 | Te Velde ............... F24C 15/327 |
| 2019/0374060 A1* | 12/2019 | Winterrose ............ A47J 36/321 |
| 2020/0029603 A1 | 1/2020 | Liss |
| 2020/0390265 A1 | 12/2020 | Incorvia et al. |
| 2021/0076862 A1* | 3/2021 | Gardner ................. F25D 17/04 |
| 2021/0177197 A1* | 6/2021 | Streeck ................... A47J 36/32 |
| 2021/0227859 A1 | 7/2021 | Liss |
| 2021/0235915 A1* | 8/2021 | Chang ..................... A47J 27/04 |

FOREIGN PATENT DOCUMENTS

| | | |
|---|---|---|
| CN | 2866384 Y | 2/2007 |
| CN | 201734493 U | 2/2011 |
| CN | 102753894 A | 10/2012 |
| CN | 104936485 A | 9/2015 |
| CN | 106580053 A | 4/2017 |
| DE | 2 211 659 | 9/1973 |
| FR | 2 753 346 A1 | 3/1998 |
| FR | 2 978 957 | 2/2013 |
| JP | 2001-299313 A | 10/2001 |
| JP | 2004-278895 A | 10/2004 |
| JP | 5800403 B1 | 10/2015 |
| JP | 2015-532145 A | 11/2018 |
| WO | WO 92/00018 A | 1/1992 |
| WO | WO 2015/018205 A1 | 2/2015 |
| WO | WO 2017/083664 A2 | 5/2017 |

OTHER PUBLICATIONS

Extended European Search Report dated Feb. 15, 2021 for European Application No. 18832831.4, 6 pages.
Non-Final Office Action dated Jul. 14, 2017 for U.S. Appl. No. 15/419,627, 11 pages.
Final Office Action dated Dec. 26, 2017 for U.S. Appl. No. 15/419,627, 10 pages.
Non-Final Office Action dated Jul. 27, 2018 for U.S. Appl. No. 15/419,627, 17 pages.
Final Office Action dated Apr. 15, 2019 for U.S. Appl. No. 15/419,627, 17 pages.
Non-Final Office Action dated Dec. 31, 2019 for U.S. Appl. No. 16/591,843, 14 pages.
Non-Final Office Action dated Jun. 16, 2017 for U.S. Appl. No. 15/487,835, 15 pages.
Final Office Action dated Oct. 2, 2017 for U.S. Appl. No. 15/487,835, 18 pages.
Non-Final Office Action dated Jul. 3, 2019 for U.S. Appl. No. 15/942,860, 10 pages.
Final Office Action dated Dec. 20, 2019 for U.S. Appl. No. 15/942,860, 8 pages.
Non-Final Office Action dated May 4, 2020 for U.S. Appl. No. 15/942,860, 12 pages.
Notice of Allowance dated Dec. 9, 2020 for U.S. Appl. No. 16/133,267, 10 pages.
Invitation to Pay Additional Fees dated Feb. 24, 2017 for International Application No. PCT/US2016/061549, 2 pages.
International Search Report and Written Opinion dated May 22, 2017 for International Application No. PCT/US2016/061549, 13 pages.
Extended European Search Report dated Jun. 18, 2019 for European Application No. 16865091.9, 7 pages.
International Search Report and Written Opinion dated Jul. 25, 2017 for International Application No. PCT/US2017/018312, 14 pages.
International Search Report and Written Opinion dated Nov. 5, 2018 for International Application No. PCT/US2018/041819, 11 pages.
International Search Report and Written Opinion dated Nov. 23, 2018 for International Application No. PCT/US2018/051367, 14 pages.
"Are You Storing Food Safely," Refrigeration, Jun. 8, 2009, https://web.archive.org/web/20090608062550/www.fda.gov:80/ForConsumers/ConsumerUpdates/ucm093704.htm, 2009, 4 pages.
"June Intelligent Oven—The Computer-based Oven That Thinks Like a Chef," Jul. 15, 2015, [retrieved from the Internet on Mar. 7, 2017], <URL: https://juneoven.com/the-oven>, 25 pages.
"Meet Mellow: the Smart Sous-Vide Machine," Apr. 28, 2014, [retrieved from the Internet on Mar. 7, 2017], <URL: https://cookmellow.com/technology#anchor>, 12 pages.
Sous Vide, published Aug. 18, 2015, http://web.archive.org/web/20150818223717/https://www.molecularrecipes.com/sous-vide-class/sous-vide-cooking-time-temperature/, 2015, 8 pages.
"Thermonix USA: Home Cooking, Made Easy," Feb. 5, 2001, [retrieved from the Internet on Mar. 7, 2017], <URL: https://thermonix-state-of-the-art-machinery-specs/>, 5 pages.
"Why Sous Vide Supreme?," Sous-Vide Supreme—Offical Site, Sep. 19, 2010, [retrieved from the Internet on Mar. 7, 2017], <URL: https://sousvidesupreme.com/en-us/learn/why-sousvide-supreme.htm/>, 10 pages.
Extended European Search Report dated Jul. 26, 2021 for European Application No. 18855749.0, 7 pages.

* cited by examiner

10

```
┌─────────────────────────────────────────────────────────────┐
│ Dispose at least one of a first food item in a first        │
│ thermal container, a second food item in a second thermal   │
│ container, and a third food item in a third thermal         │
│ container                                                   │
│ 11                                                          │
└─────────────────────────────────────────────────────────────┘
                              │
                              ▼
┌─────────────────────────────────────────────────────────────┐
│ Cool a first volume of fluid circulating through a portion  │
│ of the first thermal container and a portion of the second  │
│ thermal container such that thermal energy from at least    │
│ the first food item and the second food item is transferred │
│ to the cooled fluid                                         │
│ 12                                                          │
└─────────────────────────────────────────────────────────────┘
                              │
                              ▼
┌─────────────────────────────────────────────────────────────┐
│ Heat, in response to a first criterion being satisfied, the │
│ first volume of fluid circulating through the portion of    │
│ the first thermal container and the portion of the second   │
│ thermal container such that thermal energy from the heated  │
│ fluid is transferred to the first food item and the second  │
│ food item                                                   │
│ 13                                                          │
└─────────────────────────────────────────────────────────────┘
                              │
                              ▼
┌─────────────────────────────────────────────────────────────┐
│ Convey, in response to a second criterion being satisfied,  │
│ a second volume of fluid into a portion of the third        │
│ thermal container such that thermal energy from the second  │
│ volume of fluid is transferred to the third food item       │
│ 14                                                          │
└─────────────────────────────────────────────────────────────┘
```

FIG. 23

APPARATUS AND METHODS FOR AT LEAST SEMI-AUTONOMOUS MEAL STORAGE AND COOKING

CROSS-REFERENCE TO RELATED APPLICATIONS

This application is a continuation of U.S. patent application Ser. No. 16/133,267, entitled "Apparatus and Methods for At Least Semi-Autonomous Meal Storage and Cooking," filed Sep. 17, 2018 (now U.S. Pat. No. 10,976,097), which claims priority to and the benefit of U.S. Provisional Patent Application Ser. No. 62/599,060 entitled, "Apparatus and Methods for At Least Semi-Autonomous Meal Storage and Cooking," filed Sep. 15, 2017 and U.S. Provisional Patent Application Ser. No. 62/615,136 entitled, "Apparatus and Methods for At Least Semi-Autonomous Meal Storage and Cooking," filed Jan. 9, 2018, the disclosure of each of which is incorporated herein by reference in its entirety.

And U.S. Provisional Patent Application Ser. No. 62/615,136 entitled, "Apparatus and Methods for At Least Semi-Autonomous Meal Storage and Cooking," filed Jan. 9, 2018, the disclosure of each of which is incorporated herein by reference in its entirety.

BACKGROUND

The embodiments described herein relate to apparatus and methods for meal refrigeration and/or cooking and more specifically, to apparatus and methods for at least semi-autonomous storing, refrigerating, and cooking of meals.

Food storage devices and food cooking devices are known. Some known devices, however, do not provide a means for storing and/or cooking food items via different storage and/or cooking modalities, temperature profiles, time profiles, and/or the like. For example, in some instances, it may be desirable to store and/or cook food items according to a type of the food item (e.g., a protein, a starch, a vegetable, a sauce, and/or the like). Some devices that provide a way to store or cook food items in different ways can be expensive and/or unintuitive. Moreover, some such devices are typically configured to either store food (e.g., a refrigeration device or the like) or cook food (e.g., an oven, stove, microwave, etc.) but are not configured to provide both storage and cooking functions. Finally, some known devices can be large appliances that occupy substantial space in a kitchen.

Thus, a need exists for improved apparatus and methods for at least semi-autonomous storing and cooking of meals.

SUMMARY

Apparatus and methods for at least semi-autonomous meal storage and cooking are described herein. In some embodiments, a method of using a storage and cooking device having multiple thermal containers includes disposing at least one of a first food item in a first thermal container, a second food item in a second thermal container, and a third food item in a third thermal container. A first volume of fluid circulating through a portion of the first thermal container and a portion of the second thermal container is cooled such that thermal energy from at least the first food item and the second food item is transferred to the cooled fluid. In response to a first criterion being satisfied, the first volume of fluid circulating through the portion of the first thermal container and the portion of the second thermal container is heated such that thermal energy from the heated fluid is transferred to the first food item and the second food item. In response to a second criterion being satisfied, a second volume of fluid is conveyed into a portion of the third thermal container such that thermal energy from the second volume of fluid is transferred to the third food item.

BRIEF DESCRIPTION OF THE DRAWINGS

FIG. 23 is a flowchart illustrating a method of using a semi-autonomous storage and/or cooking device according to an embodiment.

DETAILED DESCRIPTION

Figure 1:
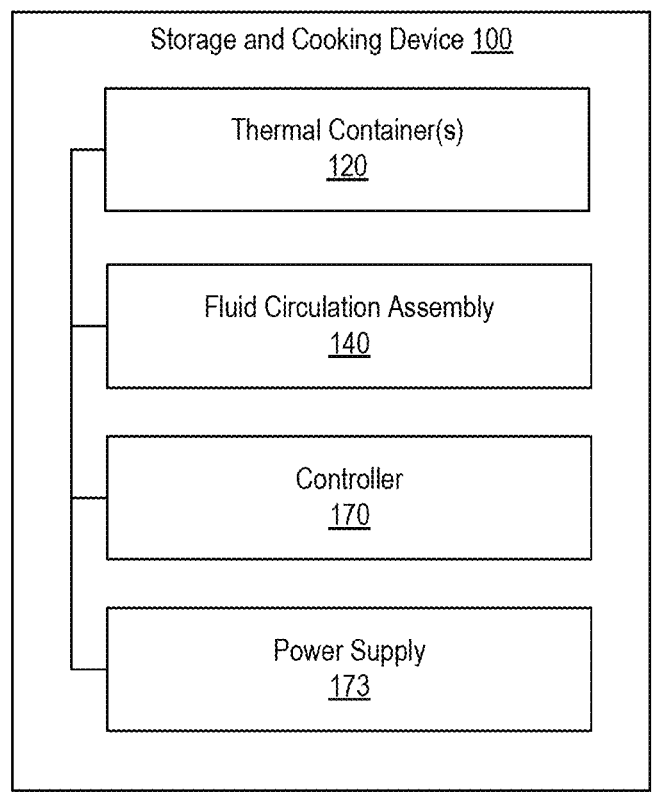
FIG. 1 is a schematic illustration of a semi-autonomous storage and/or cooking device according to an embodiment.

Apparatus and methods for at least semi-autonomous meal preparation via fluid immersion are described herein. In some embodiments, a method of using a storage and cooking device having multiple thermal containers includes disposing a first food item in a first thermal container, a second food item in a second thermal container, and a third food item in a third thermal container. A volume of fluid is cooled and circulated through at least a portion of the storage and cooking device such that thermal energy from at least one of the first food item, the second food item, and the third food item is transferred to the cooled fluid. The storage and cooking device transitions from a first operating mode to a second operating mode in response to a criterion being satisfied. When in the second configuration, the storage and cooking device heats the volume of fluid and circulates the volume of fluid through at least a portion of the storage and cooking device such that thermal energy is transferred from the volume of fluid to at least one of the first food item, the second food item, and the third food item.

In some embodiments, a method of using a storage and cooking device having multiple thermal containers includes disposing at least one of a first food item in a first thermal container, a second food item in a second thermal container, and a third food item in a third thermal container. A first volume of fluid circulating through a portion of the first thermal container and a portion of the second thermal container is cooled such that thermal energy from at least the first food item and the second food item is transferred to the cooled fluid. In response to a first criterion being satisfied, the first volume of fluid circulating through the portion of the first thermal container and the portion of the second thermal container is heated such that thermal energy from the heated fluid is transferred to the first food item and the second food item. In response to a second criterion being satisfied, a second volume of fluid is conveyed into a portion of the third thermal container such that thermal energy from the second volume of fluid is transferred to the third food item.

In some embodiments, a method of using a multi-zone storage and cooking device having at least a first zone including a first thermal container and a first heating element and a second zone including a second thermal container and a second heating element includes disposing a first food item in the first thermal container and a second food item in the second thermal container. A volume of fluid circulating through a portion of the first thermal container and a portion of the second thermal container is cooled such that thermal energy from the first food item and thermal energy from the second food item is transferred to the cooled fluid. In response to a first criterion being satisfied, the volume of fluid circulating through the portion of the first thermal container and the portion of the second thermal container is heated such that thermal energy from the heated fluid is transferred to the first food item and the second food item. In response to a second criterion being satisfied, a flow of electric power is supplied that is operable to heat at least one of the first heating element or the second heating element to transfer thermal energy to at least one of the first food item or the second food item, respectively.

In some embodiments, a multi-zone storage and cooking device includes a housing with at least a first zone, a second zone independent of the first zone, a third zone independent of the first zone and the second zone, and a fluid circulation system disposed therein. The first zone includes a first thermal container configured to receive a first food item and a first heating element configured to transfer thermal energy to the first food item. The second zone includes a second thermal container configured to receive a second food item different from the first food item. The second zone includes a second heating element that is independent of the first heating element and that is configured to transfer thermal energy to the second food item. The third zone includes a third thermal container configured to receive a third food item different from the first food item and the second food item. The fluid circulation system is configured to circulate a volume of cooled fluid into a portion of the first thermal container and a portion of the second thermal container when the device is in a first operating mode. The fluid circulation system is configured to (1) circulate a volume of heated fluid into a portion of the first thermal container and a portion of the second thermal container, and (2) convey a volume of heated fluid into a portion of the third thermal container when the device is in a second operating mode.

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein the term "module" refers to any assembly and/or set of operatively-coupled electrical components that can include, for example, a memory, a processor, electrical traces, optical connectors, software (executing in hardware), and/or the like. For example, a module executed in the processor can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor) capable of performing one or more specific functions associated with that module.

As used herein, the terms "feedback", "feedback system", and/or "feedback loop" relate to a system wherein past or present characteristics influence current or future actions. For example, a fluid circulation system is said to be a feedback system wherein the state of the fluid circulation system (e.g., a measurable temperature of a desired medium) is dependent on a current or past state being fed back to the fluid circulation system. In some instances, a feedback system can be an electromechanical system including a number of relays, switches, and/or the like that can open or close an electric circuit based on a signal received from a sensor, a flow or a direction of a flow of electricity, and/or the like. In some instances, a feedback system can be controlled and/or implemented in a programmable logic controller (PLC) that can use control logic to perform one or more actions based on an input from a system component, a state of an electric circuit, and/or a flow of electric power. In some instances, a PLC can include a control scheme such as, for example, a proportional-integral-derivative (PID) controller. As such, an output of some feedback systems can be described mathematically by the sum of a proportional term, an integral term, and a derivative term. PID controllers are often implemented in one or more electronic devices. In such controllers, the proportional term, the integral term, and/or the derivative term can be actively "tuned" to alter characteristics of the feedback system.

Electronic devices often implement feedback systems to actively control electromechanical and/or fluidic systems in order to achieve and/or maintain a desired system state. For example, a feedback system can be implemented to control a fluidic system (e.g., a volume of water within a closed system) by opening or closing one or more valves, operating one or more pumps, increasing or decreasing a temperature of the water, and/or the like. Expanding further, the feedback system can determine current and/or past states (e.g., temperature, flow rate, volume, etc.) of at least a portion of the volume of water and return the past and/or current state values to, for example, a PID control scheme. In some instances, an electronic device (e.g., a controller) can implement any suitable numerical method or any combination thereof (e.g., Newton's method, Gaussian elimination, Euler's method, LU decomposition, etc.). Thus, based on the past and/or current state of at least the portion of the volume of water, the fluidic system can be actively changed to achieve a desired system state.

FIG. 1 is a schematic illustration of a storage and cooking device 100 according to an embodiment. The storage and cooking device 100 (also referred to herein as "device") can be any suitable cooking device, machine, and/or system. As described in further detail herein, for example, the device 100 can be configured to receive one or more food items disposed in one or more sealed packages, receive or retrieve information associated with the one or more food items, store the one or more food items at a first temperature (e.g., a storage temperature) prior to cooking, and cook the one or more food items in accordance with the information associated with the food items. In some embodiments, at least a portion of the device 100 can be substantially similar to or the same as the storage and/or cooking devices described in U.S. Patent Publication No. 2017/0135383 entitled, "Apparatus and Methods for At Least Semi-Autonomous Meal Storage and Cooking Via Fluid Immersion," filed May 18, 2017 (referred to herein as the "383 publication"), the disclosure of which is incorporated herein by reference in its entirety.

As shown in FIG. 1, the device 100 includes at least one thermal container 120, a fluid circulation system 140, a controller 170, and a power supply 173. Although not shown in FIG. 1, the device 100 can include a housing configured to house and/or at least partially enclose the thermal container(s) 120, the fluid circulation system 140, the controller 170, and/or the power supply 173. Moreover, the housing can include a lid, door, or other access device configured to allow access to at least a portion of the components disposed within the housing. As described in further detail herein, the device 100 (e.g., the housing) can also include one or more user interface portions such as, for example, a display or touchscreen display configured to present information associated with the device 100.

The thermal container(s) 120 can be any suitable shape, size, and/or configuration. In some embodiments, the device 100 can include a single thermal container 120. In other embodiments, the device 100 can include multiple thermal containers 120 (e.g., two, three, four, five, six, seven, eight, nine, ten, or more thermal containers 120). By way of example, in some embodiments, the device 100 can include three thermal containers 120 each of which is configured to receive a food item of a different type. Specifically, such a device can include a first thermal container configured to receive, for example, a protein; a second thermal container configured to receive, for example, a starch; and a third thermal container configured to receive, for example, a vegetable. In some embodiments, the device 100 can optionally include a fourth thermal container 120 configured to receive, for example, a sauce, dressing, condiment, seasoning, and/or the like.

The thermal container(s) 120 can be formed of and/or can include any suitable material(s) or combinations thereof. For example, in some embodiments, the thermal container(s) 120 can be formed of a material having a relatively high thermal conductivity. In other words, the thermal container(s) 120 can be formed of and/or can include materials configured to conduct and/or transfer thermal energy, for example, to or from a volume of water flowing through the fluid circulation system. In other embodiments, the thermal containers 120 can be formed of a material having a relatively low thermal conductivity (e.g., an insulating material). In other words, each thermal container 120 can include and/or can be at least partially surrounded by an insulating material. In some embodiments, the arrangement of the device 100 can be such that thermal energy can be transferred between the thermal container(s) 120 and a volume of fluid circulating through the fluid circulation system 140, while thermal energy transfer between each thermal container 120 and/or between the thermal container(s) 120 and portions of the device 100 other than the fluid circulation system 140 is limited and/or reduced.

In embodiments including multiple thermal containers 120, thermally insulating each thermal container 120 can allow for independent temperature control of each thermal container 120. For example, in some such embodiments, a thermal container can be in a relatively low temperature configuration (e.g., a storage or refrigeration configuration), while an adjacent thermal container can be in a relatively high temperature configuration (e.g., a cooking configuration). Thus, by insulating each thermal container and/or at least a portion thereof, thermal energy associated with the thermal container in the relatively high temperature configuration can be substantially isolated from the thermal container in the relatively low temperature configuration. In other words, the device 100 can have, for example, a multi-zone arrangement in which food items disposed in separate thermal containers 120 can be stored and/or cooked independently according to a set of instructions associated with each food item.

As described above, each thermal container 120 is configured to receive one or more packages of food. For example, in some embodiments, a first thermal container 120 can be configured to receive a first kind of food (e.g., meats and/or other proteins), a second thermal container can be configured to receive a second kind of food (e.g., vegetables), and a third thermal container can be configured to receive a third kind of food (e.g., starches, carbohydrates, and/or the like). In addition, in some embodiments, the device 100 can optionally include a fourth thermal container configured to receive a fourth kind of food (e.g., a sauce, dressing, condiment, seasoning, and/or the like). In some instances, one or more food items can be pre-packaged (e.g., within a fluid-tight package or cartridge), which in turn, is/are inserted into one of the thermal containers 120. Although not shown herein, the food cartridges can be any suitable shape, size, and/or configuration. For example, in some embodiments, the food cartridges can be similar in at least form and/or function to the food cartridges described in U.S. Patent Publication No. 2017/0238750 entitled, "Modular Food Cartridges for Use in a Cooking Device," filed Apr. 14, 2017 (referred to herein as the "750 publication"); and/or the food cartridges described in International Patent Application No. PCT/US2018/041819 entitled, "Food Cartridges and Carriers for Use in a Cooking Device," filed Jul. 12, 2018 (referred to herein as the "'819 application"), the disclosures of which are incorporated herein by reference in their entireties.

In some embodiments, the thermal container(s) 120 can be configured to receive thermal energy from and/or transfer thermal energy to a volume of fluid disposed in the thermal container(s) 120 or otherwise flow through or past the thermal container(s) 120. For example, in some embodiments, a volume of fluid can be transferred into one or more of the thermal containers 120 such that thermal energy can be transferred to and/or from the food items disposed therein. In other embodiments, a volume of fluid can flow through a fluid flow path (defined by the fluid circulation system 140) that is outside of the thermal containers 120. In such embodiments, at least a portion of the volume of fluid can be in contact with an outer surface of the thermal containers 120 such that thermal energy can be transferred therebetween. In some embodiments, the device 100 can include thermal containers 120 having any suitable combination of configurations. For example, in some embodiments, the device 100 can include at least one thermal container 120 configured to receive a volume of fluid and at least one thermal container 120 with an outer surface configured to be in contact with a flow of fluid flowing outside of the thermal container 120.

In still other embodiments, a thermal container 120 can include a first portion or volume configured to receive one or more food items and a second portion or volume configured to receive a volume or a flow of a volume of fluid. In such embodiments, the first portion or volume and the second portion or volume can be in fluid and thermal communication, or can be in thermal communication and fluidically isolated. In some embodiments, such a configuration can limit and/or substantially prevent contamination of the volume of fluid in the event of a leak, tear, rupture, and/or opening of a food package (e.g., a food package containing a meat or protein).

The fluid circulation system 140 of the device 100 can be any suitable shape, size, and/or configuration. The fluid circulation system 140 is configured to regulate a temperature of a working fluid such as, for example, water contained in or flowing through the device 100. For example, the fluid circulation system 140 can include any number of fluid conduits, tubing, pipes, valves, solenoids, pumps, fluid reservoirs, and/or the like that can collectively define any suitable number of fluid flow paths within the device 100. Moreover, the fluid circulation system 140 can include any number of heat exchangers and/or heat exchanger assemblies, heat sinks, heating elements, steamers, heat diffusers, cooling elements, chillers, and/or the like. In some embodiments, the fluid circulation system 140 and/or a portion thereof can be similar in form and/or function to those described in the '383 publication. As such, the fluid circulation system 140 can receive a signal and/or electrical power from the controller 170 and/or power supply 173, respectively, which is operative to controlling, changing, maintaining, and/or otherwise regulating a temperature of a volume of fluid contained in the device 100.

By way of example, in some embodiments, the fluid circulation system 140 can include a fluid reservoir configured to contain a volume of fluid such as, for example, water, which in turn, is in selective fluid communication with at least one of the thermal containers 120 (e.g., either an inner volume of the thermal container(s) 120 or an outer surface of the thermal container(s) 120) via any suitable number and/or arrangement of fluid conduits, valves, pumps, solenoids, and/or the like. Similarly, the fluid circulation system 140 can include any suitable number and/or arrangement of fluid conduits, valves, pumps, solenoids, and/or the like configured to selectively transfer a volume of fluid through one or more heat exchangers, coolers, and/or heat sources. In response to an input such as, for example, a user input (e.g., either a local input or an input via a network), an input associated with a predetermined schedule and/or event, and/or the like, the controller 170 can send a signal to the fluid circulation system 140 to regulate a flow and/or temperature of the water within the device 100. As such, the device 100 can be transferred between a first operating mode in which food items disposed in one or more thermal containers 120 are stored at or below a predetermined storage temperature and a second operating mode in which food items disposed in the one or more thermal containers 120 are cooked at or to a predetermined cooking temperature, as described in further detail herein.

Although not shown in FIG. 1, in some embodiments, the fluid circulation system 140 can form any suitable number of fluid flow paths and/or circulation loops. For example, in some embodiments, the fluid circulation system 140 can include and/or can form a single fluid flow path and/or circulation loop in which fluid flows into, flows through, and/or flows around each of the thermal containers 120. In other embodiments, the fluid circulation system 140 can include and/or can form multiple fluid flow paths and/or circulation loops. For example, in some embodiments, the fluid circulation system 140 can include a fluid flow path and/or a circulation loop for each thermal container 120 included in the device 100. In such embodiments, the fluid flow paths and/or circulation loops for each of the thermal containers 120 can be independent fluid flow paths and/or circulation loops. In other embodiments, the fluid flow paths and/or circulation loops can include one or more similar and/or combined portions. In such embodiments, the fluid flow through the fluid flow paths and/or circulation loops can be controlled by any suitable number of pumps, valves, solenoids, junctions, switches, etc.

In some embodiments, the use of multiple fluid flow paths can allow for independent cooling and/or heating of each thermal container 120. For example, in some embodiments, it may be desirable to transfer a first amount of thermal energy to a first food item disposed in a first thermal container 120 and transfer a second amount of thermal energy (different from the first amount of thermal energy) to a second food item disposed in a second thermal container 120. Moreover, it may be desirable to have a similar or substantially similar finish time for both the first food item and the second food item. Thus, the multiple fluid flow paths enables the device 100 to cook the first food item and the second food item according to instructions and/or data associated with each food item. In some instances, the controller 170 can control the fluid flow through the multiple fluid flow paths and/or circulation loops to ensure that cooking and/or substantial cooking of each of the food items is completed at substantially the same time.

The controller 170 can be any suitable electronic and/or electromechanical device configured to at least semi-autonomously control at least a portion of the device 100. For example, in some embodiments, the controller 170 can include any suitable electronic and/or electromechanical device configured to control at least a portion of the device 100. The controller 170 can perform any number of processes and/or can execute any suitable instructions or code associated with controlling a portion of the device 100 (e.g., via a feedback control system, PLC, PID, etc.) to store and cook food items placed in the device 100.

More specifically, the controller 170 can include, for example, at least the power source 173, a memory, a processor, and an input/output (I/O) interface. The memory can be, for example, a random access memory (RAM), a memory buffer, a hard drive, a read-only memory (ROM), an erasable programmable read-only memory (EPROM), and/or the like. In some embodiments, the memory stores instructions to cause the processor to execute modules, processes, and/or functions associated with controlling one or more portions of the device 100, as described above. The processor of the controller 170 can be any suitable processing device such as general-purpose processor (GPP), a central processing unit (CPU), an accelerated processing unit (APU), a field programmable gate array (FPGA), an application specific integrated circuit (ASIC), and/or the like. The processor can be configured to run or execute a set of instructions or code stored in the memory associated with the operation of one or more portions of the device 100. The I/O interface can be, for example, a Universal Serial Bus (USB) interface; an Institute of Electrical and Electronics Engineers (IEEE) 1394 interface (FireWire); a Thunderbolt™ interface; a Serial ATA (SATA) interface or external Serial ATA (eSATA) interface; a network interface card (including one or more Ethernet ports and/or a wireless radios such as a wireless fidelity (WiFi®) radio, a Bluetooth® radio, a near field communication (NFC) radio, a ZigBee protocol radio, a Thread protocol radio, a radio-frequency identification (RFID) radio, and/or the like). The I/O interface is configured to send signals to and/or receive signals from the processor. Similarly, the I/O interface can be configured to receive signals from and/or send signals (e.g., data, electric power, etc.) to any suitable electric and/or electronic device included in the device such as, for example, one or more sensors (e.g., fluid level sensors, flow rate sensors, thermometers, thermistors, etc.), thermoelectric coolers (e.g., Peltier coolers or the like), compressors, liquid heat exchangers, heaters, boilers, steam generators, pumps, optical scanners, barcode scanners, quick response (QR) code scanners, RFID transmitters, inter-integrated circuits (I2Cs), universal asynchronous receive/transmit (UART) devices, serial peripheral interface (SPI) devices, and/or the like.

As described above, in some instances, the controller 170 can perform and/or execute one or more processes associated with maintaining a food contained in the thermal container(s) 120 at a predetermined temperature prior to cooking the food item(s) (e.g., refrigerating). In such instances, the controller 170 can send signals to and/or receive signals from, for example, any number of pumps, valves, solenoids, heat exchangers or heat exchanger assemblies, sensors, etc. associated with maintaining a volume of the fluid disposed in or flowing through the fluid circulation system 140 substantially at the predetermined temperature. For example, the controller 170 can send one or more signals to the fluid circulation system 140 such that the fluid flows through a chiller, chiller assembly, heat exchanger, cooler, refrigeration unit, etc. The cooled fluid can then flow into one or more thermal containers 120 and/or can flow around at least a portion of an outer surface of one or more thermal containers 120. In this manner, the fluid can maintain the volume defined by the thermal container 120 substantially at a predetermined storage temperature, which in turn, can remove thermal energy from the food disposed therein to maintain the food substantially at the predetermined temperature. In some instances, the predetermined temperature can be, for example, about 40° F. In other words, the controller 170 can be configured to perform one or more processes associated with refrigerating the food within the thermal container(s) 120 prior to cooking the food.

In some embodiments, the fluid circulating through the fluid circulation system 140 is water. In such embodiments, the use of water as a cooling fluid can be desirable because the water can also be used as a heating fluid. Moreover, the water can be drained from the fluid circulation system 140 during one or more phases of a cooking operation. For example, in some embodiments, it may be desirable to drain the fluid (e.g., water) during a last phase or stage of cooking in which one or more heating elements can be used to transfer a relatively high amount of thermal energy to the food items. In such embodiments, draining the fluid (e.g., water) can limit and/or can substantially prevent undesired boiling of the fluid and/or a production of high-pressure steam and/or the like. If the cooling fluid is a refrigerant (e.g., r134a or the like), it would also be undesirable to expose the fluid (e.g., refrigerant) to the relatively high amount of thermal energy released by the heating elements.

Thus, in some embodiments, it can be desirable to use water as the cooling and heating fluid configured to circulate through the fluid circulation system 140.

In some instances, the controller 170 can perform and/or execute one or more processes associated with cooking food disposed in the thermal container 120. In such instances, the controller 170 can be configured to send signals to and/or receive signals from, for example, any number of pumps, valves, solenoids, heat exchangers or heat exchanger assemblies, heating elements, sensors (e.g., fluid level sensors, temperature sensors, and/or the like), etc. associated with maintaining a volume of fluid within the thermal container(s) 120 substantially at a predetermined temperature. As described above with reference to the cooling configuration, the heated fluid can then flow into one or more of the thermal containers 120 and/or can flow around at least a portion of the outer surface of one or more of the thermal containers 120. In this manner, the fluid can maintain the inner volume defined by the thermal containers 120 substantially at the predetermined cooking temperature, which in turn, can transfer thermal energy to the food disposed therein to cook the food substantially at the predetermined temperature (e.g., any suitable cooking temperature such as, for example, a temperature between 140° F. and 212° F.).

As described above, the fluid used to transfer thermal energy to the food items and/or used to receive thermal energy from the food items can be water. In some instances, the use of water as the heating fluid can be desirable because a portion of the water flowing through one or more fluid flow paths can also be used to cook one or more food items via a different modality. For example, in some embodiments, the device 100 can be in a cooking configuration such that heated fluid flows through the fluid circulation system 140 in a substantially closed loop. In such embodiments, a portion of the fluid circulation system 140 and/or the fluid flow path can pass through and/or can pass around one or more thermal containers 120 to transfer thermal energy to an inner volume of the thermal container(s) 120. As such, the food item disposed in the thermal container(s) 120 can be cooked. In some embodiments, however, it may be desirable to transfer a portion of the fluid into the inner volume of the thermal container(s) 120 and into contact with the food items (or a package containing the food items) disposed therein. Thus, while the fluid circulating through the fluid circulation system 140 can at least partially cook the food items by heating the inner volume of the thermal container(s) 120 (e.g., similar to baking), the fluid transferred into the thermal container(s) 120 can be configured to at least partially cook the food items via fluid immersion, sous-vide, Bain Marie, boiling, and/or any other suitable cooking modality. In addition, in some instances, a portion of the fluid can be heated to a relatively high temperature and injected or transferred into the thermal container 120 in the form of steam (e.g., for steaming vegetables or any other suitable cooking process).

In some embodiments, the device 100 can be configured to store and/or cook food items via different modalities. For example, in some embodiments, a first thermal container 120 containing a first food item such as a meat or protein can be configured to cook the first food item via a first cooking modality. As used herein, the term modality can refer to a method, manner, and/or process of performing an operation and/or can otherwise refer to one or more characteristics associated with the method, manner, and/or process of performing the operation.

The first cooking modality can include, for example, transferring a volume of fluid into (or circulating a volume of fluid through) a first portion of the first thermal container 120 that is in thermal communication and fluidic isolation from second a portion of the first thermal container 120 in which the first food item is disposed. In some such embodiments, the first food item (e.g., the meat or protein) can be disposed in a cartridge or package that can include or contain a volume of fluid. As such, the volume of fluid transferred into or circulated through the first portion of the thermal container 120 can be heated to a predetermined and/or desired temperature. The thermal container 120 can be configured to transfer thermal energy from the first portion of the thermal container 120 to the second portion of the thermal container 120. At least a portion of the thermal energy transferred to the second portion of the thermal container 120, in turn, is transferred to the first food item and/or the fluid within the cartridge or package containing the first food item, thereby cooking the first food item to a predetermined and/or desired temperature and/or extent.

In some embodiments, a second thermal container 120 of the device 100 that contains a second food item such as a starch or carbohydrate can be configured to cook the second food item via a second cooking modality different from the first cooking modality. In such embodiments, the device 100 can be configured to transfer a heated fluid into the second thermal container 120 and/or a cartridge, package, and/or carrier containing the second food item to cook the second food item via fluid immersion, sous-vide, and/or Bain Marie. For example, in some embodiments, the second food item can be disposed in a cartridge and/or carrier similar to those described in the '819 application. Moreover, in such embodiments, the device 100, the second thermal container 120, and/or the cartridge or carrier containing the second food item can include a siphon arrangement as described in detail in the '819 application.

In some embodiments, a third thermal container 120 of the device 100 that contains a third food item such as a vegetable can be configured to cook the third food item via a third cooking modality different from the first cooking modality and/or the second cooking modality. For example, in some embodiments, the device 100 can be configured to transfer and/or circulate a heated fluid around an outer surface of the third thermal container 120, which in turn, can be configured to transfer at least a portion of the thermal energy of the heated fluid to the third food item. In some embodiments, the thermal energy transferred to the third food item can be sufficient to cook the third food item to a desired temperature and/or desired extent. In some embodiments, the device 100 can be configured to selectively inject a volume of fluid (e.g., in liquid form or in the form of steam) into the third thermal container 120, which in turn, can increase a humidity within the third thermal container 120. In some instances, the increased humidity can enhance and/or facilitate the cooking of the third food item.

In some embodiments, the device 100 can optionally include a fourth thermal container 120 that contains a fourth food item such as a sauce, dressing, etc. and that can be configured to cook the fourth food item via a fourth cooking modality different from the first, the second, and/or the third cooking modalities. For example, in some embodiments, the fourth food item disposed in the fourth thermal container can receive thermal energy from, for example, a flow of ambient air within the device 100. In such embodiments, heated fluid flowing in and/or around the first, second, and/or third thermal containers 120 can transfer a portion of its thermal energy to an ambient environment within the device, which in turn, can heat and/or transfer thermal energy to the fourth food item. In other embodiments, the fourth thermal container 120 can be configured to transfer thermal energy to or from the fourth food item via any suitable modality such as, for example, the first, the second, and/or the third cooking modalities.

As described above, the first food item, the second food item, and the third food item can each be cooked via a different cooking modality. In some embodiments, the multi-zone and/or multi-modality arrangement of the device 100 can, for example, increase safety of using the device 100. For example, in some instances, transferring thermal energy between the first food item (e.g., the meat and/or protein) and the volume of fluid disposed in and/or circulating through a portion of the fluid circulation system 140 while fluidically separating and/or isolating the first food item from the volume of fluid can limit and/or can substantially prevent contamination of the volume of fluid in the event that the package and/or cartridge containing the first food item is opened, torn, ruptured, and/or otherwise unsealed. As such, the device 100 can use at least a portion of the volume of fluid to transfer thermal energy between the second food item and at least a portion of the volume of fluid and/or the third food item and at least a portion of the volume of fluid. The multi-zone and/or multi-modality arrangement of the device 100 can also increase cleanability of the device 100 by limiting potential modes of contaminating the volume of fluid and/or by directly draining at least a portion of the volume of fluid after cooking one or more of the food items (e.g., after cooking the second food item as described in the '819 application).

In addition to being cooked via different modalities, in some instances, the first food item, the second food item, and/or the third food item (and/or optionally, the fourth food item) can each be cooked for a predetermined time and/or at or to a predetermined temperature. The cooking time and/or the cooking temperature can be based on, for example, instructions and/or information associated with each food item. In some instances, the cooking temperature and/or cooking time can be different for each individual food item. In other instances, the cooking temperature and/or cooking time associated with two or more food items can be the same or substantially the same. In other embodiments, two of the food items and/or all of the food items can be cooked via the same cooking modality and/or can be cooked for the same cooking time or at the same cooking temperature. Moreover, in some embodiments, the device 100 can be configured to cook one or more food items in multiple stages. For example, in some embodiments, the device 100 can be configured to at least partially cook one or more food items via any of the modalities described above during a first stage of a cooking process. In such embodiments, at a predetermined time and/or according to a predetermined or pre-defined profile associated with the one or more food items, the device 100 can be configured to at least partially cook the one or more food items via a different modality during a second stage of the cooking process. For example, in some embodiments, the device 100 can include one or more heating elements or the like that can be used during the second stage of the cooking process to heat, cook, bake, roast, broil, brown, toast, etc. the one or more food items. The one or more heating elements can be disposed in any suitable position within the device 100. For example, in some embodiments, the device 100 can include a heating element above or below one or more thermal containers and can be spaced at a desired distance to allow for broiling, toasting, and/or any other desired mode of cooking.

Figure 2:
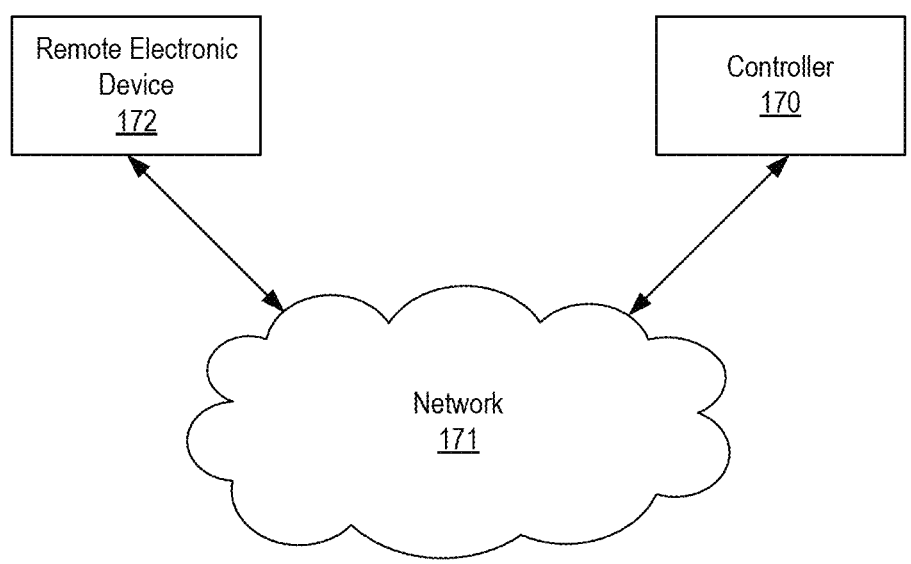
FIG. 2 is a schematic illustration of a controller included in the semi-autonomous storage and/or cooking device of FIG. 1 and an electronic device each of which is in communication with a network.

As shown in FIG. 2, in some embodiments, the controller 170 of the device 100 can include a I/O interface such as a network interface card (e.g., including at least one of an Ethernet port and a wireless radio) configured to place the controller 170 in communication with a network 171. The network 171 can be any suitable network such as, for example, a wide area network (WAN), a local area network (LAN), a virtual local area network (VLAN), the Internet, a cellular data network such as long term evolution (LTE), etc. The network 171 can be implemented as a wired or wireless network. In this manner, a user can remotely send signals to the controller 170 via the network 171 and a remote electronic device 172 such as a handheld controller, a mobile device, a smartphone, a tablet, a laptop, a personal (PC), and/or the like. For example, the remote electronic device 172 can include at least a processor, a memory, and a display and can run, for example, a personal computer application, a mobile application, a web page, and/or the like. In this manner, a user can manipulate the remote electronic device 172 such that data associated with the device 100 is graphically represented on the display of the remote electronic device 172 (e.g., via an application or "app"). Thus, the user can interact with the app to send signals to and/or receive signals from the controller 170 of the device 100 via the network 171. In such instances, the user can use the remote electronic device 172, for example, to establish a target time at which food should be cooked and/or ready for consumption, to override a pre-programmed process, to turn on or off the device 100 (e.g., place in a "powered on" state or a "powered off" state, respectively), and/or to control any other suitable function of the controller 170 and/or device 100.

As described above, the controller 170 and/or the device 100 can include any suitable sensor, encoder, scanner, and/or the like configured to collect data associated with the operation or lack of operation of a portion of the device 100 and can send the data to the controller 170. For example, in some embodiments, the device 100 can include a scanner such a barcode scanner, a QR code scanner, a NFC device or radio, a RFID device or radio, and/or the like configured to scan, detect, and/or otherwise receive data associated with the food disposed within the device 100. More specifically, in some embodiments, the food is disposed in one or more packages, each of which can include at least one bar code, QR code, and/or RFID tag configured to identify the food contained therein. The device 100 can include a bar code, QR code scanner, and/or RFID transceiver configured to scan the code on the package and/or otherwise receive a signal from the package when the food is inserted into the device 100, and based on data associated with the scanned code or signal, can determine information associated with the food contained in the package. Such information or data can be stored, for example, in the memory of the controller 170 and/or in a database operative coupled thereto. The information and/or data can include, for example, storing and/or cooking instructions, times, temperatures, expiration dates, and/or any other suitable information, as described in further detail herein.

Although not shown in FIG. 1, in some embodiments, the device 100 can be configured for use in and/or with one or more additional appliances configured to store and/or cook food items (e.g., an oven, stove, range, refrigerator, etc.). By way of example, in some embodiments, the device 100 can be an insertable or modular device configured to be inserted and/or "plugged" into an oven or the like. In such embodiments, portions of the device 100 can be stored in and/or otherwise can be part of the oven. For example, at least a portion of the fluid circulation system 140 and/or controller 170 can be included in and/or otherwise integrated into the oven. As such, the device 100 can utilize, for example, the heating elements of the oven to heat a volume of fluid disposed in or flowing through the fluid circulation system 140. In addition, the device 100 can utilize the heating elements of the oven to heat and/or cook the food items via a different cooking modality (e.g., baking and broiling). Moreover, in some embodiments, any suitable portion of a cooling assembly (e.g., heat exchanger, refrigeration unit, compressor, chiller, etc.) can be contained in and/or otherwise integrated into the oven or the like.

In some such embodiments, the device 100 can include any suitable interface, port(s), connector(s), etc. configured to connect or couple a portion of the device 100 to one or more portions of the oven. For example, in some embodiments, the device 100 can be inserted into the oven such that one or more ports of the device 100 are physically and/or fluidically coupled to one or more ports of the oven. In such embodiments, the device 100 can include one or more thermal containers 120 and one or more flow paths (as described above) while the oven or other appliance can include other portions of the device 100 (e.g., the controller 170, portions of the fluid circulation system 140, one or more heating elements, one or more cooling assemblies, and/or the like). Thus, when the device 100 is inserted into the oven, the one or more flow paths defined by the device 100 are placed in fluid communication with the portions of the fluid circulation system 140 disposed in or integrated into the oven or the like. Thus, such a device 100 can be inserted into and/or "plugged" into the oven or the like to store or cooked food items contained therein in a manner substantially similar to that described above.

Although the device 100 is described above as being inserted into or "plugged" into the oven, in other embodiments, the device 100 can be configured to be disposed outside of one or more appliance while still utilizing portions of the one or more appliance. For example, in some embodiments, the device 100 can be configured to for use with an oven or the like and a refrigerator or the like. In such embodiments, the device 100 can include one or more ports, connectors, couplers, etc. configured to establish selective fluid communication between one or more flow paths of the device 100 and one or more portions of the oven and/or refrigerator. For example, the device 100 can be configured to utilize the heating elements of the oven to heat a volume of fluid and can be configured to utilize the cooling and/or refrigeration elements of the refrigerator. Accordingly, the device 100 can be included in and/or can otherwise form a portion of a larger food storage and/or food cooking system or the like.

Figure 3:
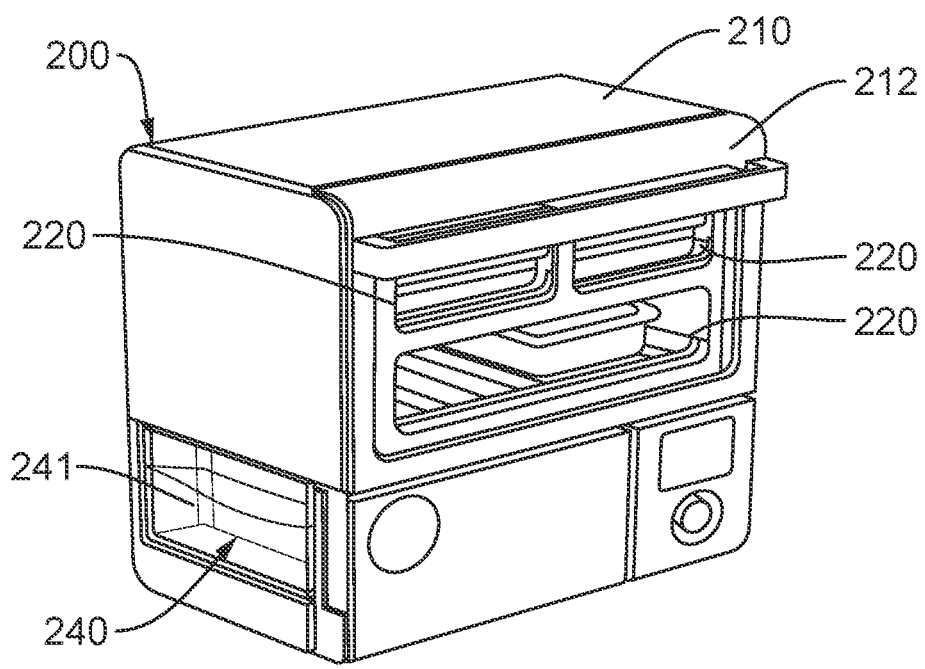
FIGS. 3 and 4 illustrate a semi-autonomous storage and/or cooking device according to an embodiment.
Figure 4:
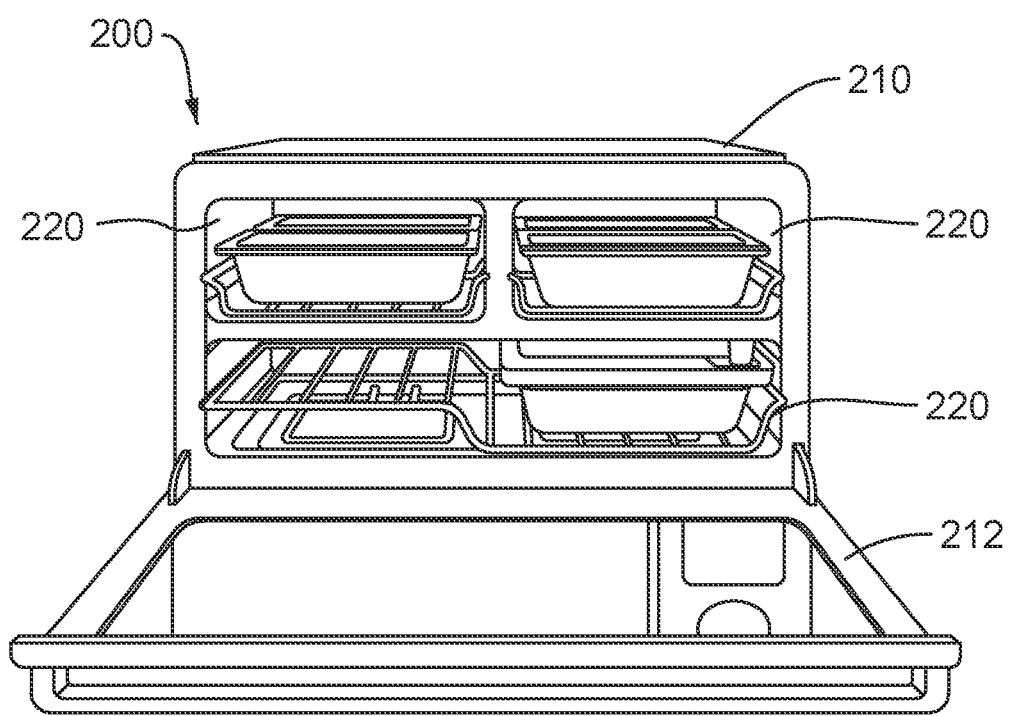

FIGS. 3 and 4 illustrate a semi-autonomous storage and/or cooking device 200 according to an embodiment. The storage and/or cooking device 200 (also referred to herein as "device") can be any suitable cooking device, machine, and/or system. As described in further detail herein, for example, the device 200 can be configured to receive one or more food items disposed in one or more sealed packages, receive or retrieve information associated with the one or more food items, store the one or more food items at a first temperature (e.g., a storage temperature) prior to cooking, and cook the one or more food items in accordance with the information associated with the food items. In some embodiments, at least a portion of the device 200 can be substantially similar to or the same as the storage and/or cooking device 100 described above with reference to FIG. 1. Accordingly, portions of the device 200 are not described in further detail herein.

As shown in FIGS. 3 and 4, the device 200 includes a housing 210, a set of thermal container 220, and a fluid circulation system 240. Although not shown in FIGS. 3 and 4, the device 200 can also include a controller and a power supply, which can each be similar in at least form and/or function to the controller 170 and the power supply 173, respectively, described above with reference to FIGS. 1 and 2. As shown, the housing 210 of the device 200 is configured to house and/or at least partially enclose the set of thermal containers 220, the fluid circulation system 240, and/or any other suitable portion of the device 200. As shown in FIGS. 3 and 4, the housing 210 is substantially rectangular and can have a size suitable for placement on or in, for example, a kitchen countertop, a cabinet, and/or the like. In some embodiments, the housing 210 can have a size suitable for placement in one or more other appliances such as, for example, an oven, or the like. The housing 210 includes a lid, door, and/or access member (referred to herein as "lid 212") is movably coupled to the housing 210 and that can be transitioned from a closed configuration to an open configuration to allow a user to access the components contained within the housing 210. In the embodiment shown in FIGS. 3 and 4, the device 200 has a "front-loading" configuration in which moving the lid 212 from the closed configuration (FIG. 3) to the open configuration (FIG. 4) allows access to an inner portion of the housing 210 via a front portion of the device 200. In other embodiments, the housing 210 and/or the lid 212 can have any suitable configuration. For example, in some embodiments, the device 200 can include a housing having a separate lid for each thermal container included in the device 200.

As described above, at least a portion of the set of thermal containers 220, at least a portion of the fluid circulation system 240, and at least a portion of the controller are configured to be disposed within the housing 210. The thermal containers 220 can be formed of and/or can include any suitable material(s) and/or combinations thereof. For example, in some embodiments, the thermal containers 220 can be formed of a metal such as aluminum, stainless steel, and/or the like. In such embodiments, the constituent material of the thermal containers 220 can have a relatively high thermal conductivity (e.g., between about 10 Watts per meter-Kelvin (W/mk) and about 250 W/mk, as described above). In other embodiments, the thermal containers 220 are formed from a material having a relatively low thermal conductivity (e.g., between about 0.1 W/mk and about 1.8 W/mk, as described above). As described above with reference to the thermal container(s) 120, the insulating material can thermally isolate each thermal container 220 such that a temperature associated with each thermal container 220 can be independently controlled substantially without transferring thermal energy to, for example, adjacent thermal containers 220, or other portions of the device 200. In other words, the device 200 can have, for example, a multi-zone arrangement in which food items disposed in separate thermal containers 220 can be stored and/or cooked independently accordingly to a set of instructions associated with each food item.

In this embodiment, the device 200 includes three thermal containers 220. Each thermal container 220 is configured to receive one or more packages of food. For example, in some embodiments, a first thermal container 220 (e.g., an upper right thermal container as shown in FIGS. 3 and 4) can be configured to receive a first kind of food (e.g., meats and/or other proteins), a second thermal container (e.g., an upper left thermal container as shown in FIGS. 3 and 4) can be configured to receive a second kind of food (e.g., vegetables), and a third thermal container (e.g., a bottom thermal container as shown in FIGS. 3 and 4) can be configured to receive a third kind of food (e.g., starches, carbohydrates, and/or the like). In some instances, one or more food items can be pre-packaged (e.g., within a fluid-tight package or cartridge), which in turn, is/are inserted into one of the thermal containers 220. In other embodiments, food items need not be pre-packaged prior to being position in the thermal containers 220. Although not shown herein, the food cartridges can be any suitable shape, size, and/or configuration. For example, in some embodiments, the food cartridges can be similar in at least form and/or function to the food cartridges described in the '750 publication and/or the '819 application.

In some embodiments, the thermal containers 220 can be configured to receive thermal energy from and/or transfer thermal energy to a volume of fluid disposed in the thermal containers 220 or otherwise flow through or past the thermal containers 220. For example, in some embodiments, a volume of fluid can be transferred into one or more of the thermal containers 220 such that thermal energy can be transferred between the food items disposed therein. In other embodiments, a volume of fluid can flow through a fluid flow path (defined by the fluid circulation system 240) that is outside of the thermal containers 220. In such embodiments, at least a portion of the volume of fluid can be in contact with an outer surface of the thermal containers 220 such that thermal energy can be transferred therebetween. In some embodiments, the device 200 can include thermal containers 220 having any suitable combination of configurations. For example, in some embodiments, the device 200 can include at least one thermal container 220 configured to receive a volume of fluid and at least one thermal container 220 with an outer surface configured to be in contact with a flow of fluid flowing outside of the thermal container 220. In still other embodiments, a thermal container 220 can include a first portion or volume configured to receive one or more food items and a second portion or volume configured to receive a volume or a flow of a volume of fluid. As such, the thermal containers 220 can be substantially similar in at least form and/or function to the thermal containers 120 described above with reference to FIG. 1 and, thus, are not described in further detail herein.

The fluid circulation system 240 of the device 200 can be any suitable shape, size, and/or configuration. The fluid circulation system 240 is configured to regulate a temperature of a working fluid such as, for example, water at least temporarily disposed in a fluid reservoir 241. For example, the fluid circulation system 240 can include any number of fluid conduits, tubing, pipes, valves, solenoids, pumps, and/or the like configured to place the fluid reservoir 241 in fluid communication with any suitable number of fluid flow paths within the device 200. Moreover, although not shown in FIGS. 3 and 4, the fluid circulation system 240 can include any number of heat exchangers and/or heat exchanger assemblies, heat sinks, heating elements, steamers, heat diffusers, cooling elements, chillers, and/or the like. In some embodiments, the fluid circulation system 240 and/or a portion thereof can be similar in form and/or function to the fluid circulation system 140 described in detail above with reference to FIG. 1. Thus, the fluid circulation system 240 is not described in further detail herein.

As shown in FIG. 4, in some embodiments, the device 200 and/or one or more of the thermal containers 220 can include a heating element and or the like configured to transfer thermal energy to the food item contained therein. For example, in some embodiments, it may be desirable to change the appearance of the food items by roasting, baking, broiling, browning, toasting, and/or otherwise cooking the food items via a heating element rather than via a heated fluid. In some such embodiments, a cooking procedure can be split, for example, into two operations. In the first operation, the food items can be cooked via the methods described above. In the second operation, the food items can be cooked via the heating elements and/or the like. In some instances, a user can remove a food item after the first operation and can reconfigure the packaging and/or remove the food item from the packaging prior to initiating the second operation. In other instances, such a transition and/or reconfiguration can be performed automatically by the device 200. In some instances, the first operation can be performed at relatively low temperatures, which can, for example, allow a user to leave the device 200 unattended during the first operation. In some instances, the second operation can be performed at relatively high temperatures such that a user may find it desirable to be present during the second operation. In other instances, the method of performing the first operation and the second operation can allow a user to leave the device 200 unattended during both the first operation and the second operation.

In some instances, the use of the heating elements can result in a relatively high temperature within at least a portion of the device 200 (e.g., above 300° F., above 400° F., above 500° F., or more). In some instances, heating to such temperatures can result in a failure or melting of commonly used insulating material which may otherwise be used to insulate the thermal containers 220 (e.g., insulating material configured to facilitate the refrigeration or storage of the food items disposed in the thermal containers 220). Accordingly, using the fluid for both cooling and heating the food items can allow for cooking in a relatively wide range of temperatures and via multiple modalities, as described above.

As described in detail above with reference to the device 100, the device 200 can perform and/or execute one or more processes associated with maintaining food contained in the thermal containers 220 at a predetermined temperature prior to cooking the food (e.g., refrigerating). In such instances, the controller can send one or more signals to the fluid circulation system 240 such that cooled fluid can flow into one or more thermal containers 220 and/or can flow around at least a portion of an outer surface of one or more thermal containers 220. In this manner, the fluid can maintain the inner volume defined by the thermal containers 220 substantially at a predetermined storage temperature, which in turn, can remove thermal energy from the food disposed therein to maintain the food substantially at the predetermined temperature. In some instances, the predetermined temperature can be, for example, about 40° F. In addition, the device 200 can perform and/or execute one or more processes associated with cooking food disposed in the thermal container 220. In such instances, the controller can send signals to the fluid circulation system 240 such that heated fluid can flow into one or more of the thermal containers 220 and/or can flow around at least a portion of the outer surface of one or more of the thermal containers 220. In this manner, the fluid can maintain the inner volume defined by the thermal containers 220 substantially at the predetermined cooking temperature, which in turn, can transfer thermal energy to the food disposed therein to cook the food substantially at the predetermined temperature (e.g., any suitable cooking temperature such as, for example, a temperature between 140° F. and 212° F.).

Although not described in detail herein, the device 200 can be configured to store and/or cook the food items disposed in the thermal containers 220 via any suitable modality. Likewise, the device 200 can be configured to store and/or cook the food items disposed in the thermal containers 220 at or to any suitable temperature and/or for any suitable time. For example, in some embodiments, the device 200 can store and/or cook food items disposed in the thermal containers 220 in a manner substantially similar to that described above with reference to the device 100. Thus, the operation of the device 200 is not described in further detail herein.

Figure 5:
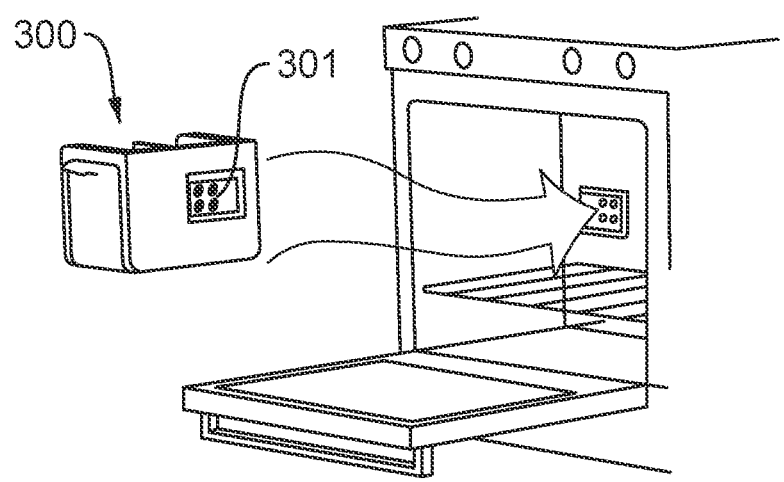
FIGS. 5-7 illustrate at least a portion of a semi-autonomous storage and/or cooking device according to an embodiment and configured for use with or in a kitchen appliance.
Figure 6:
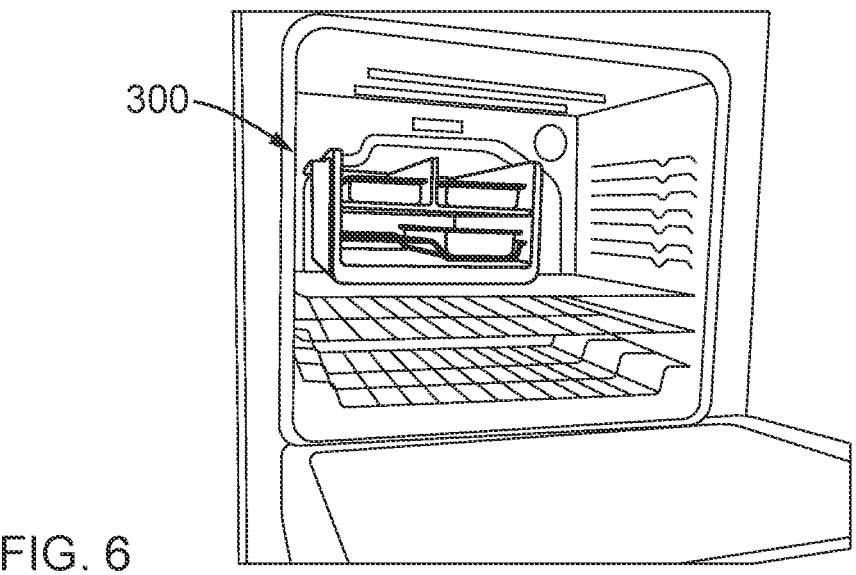
Figure 7:
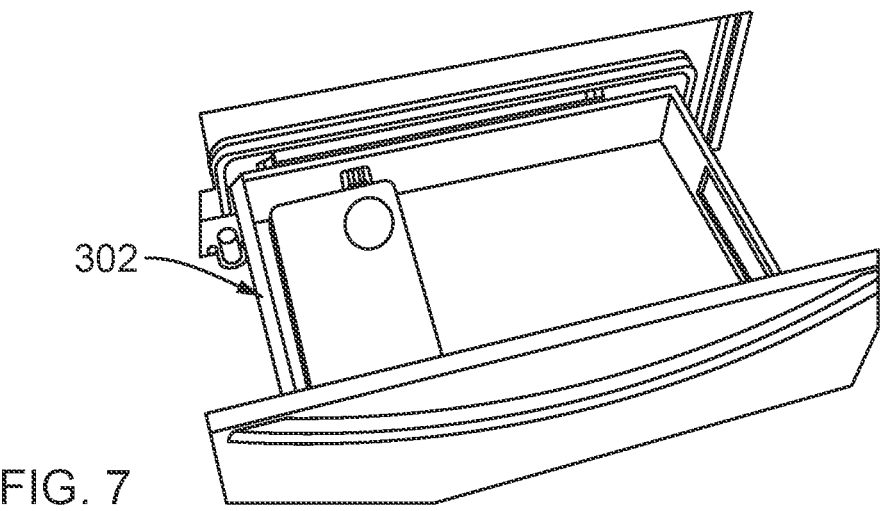
Figure 8:
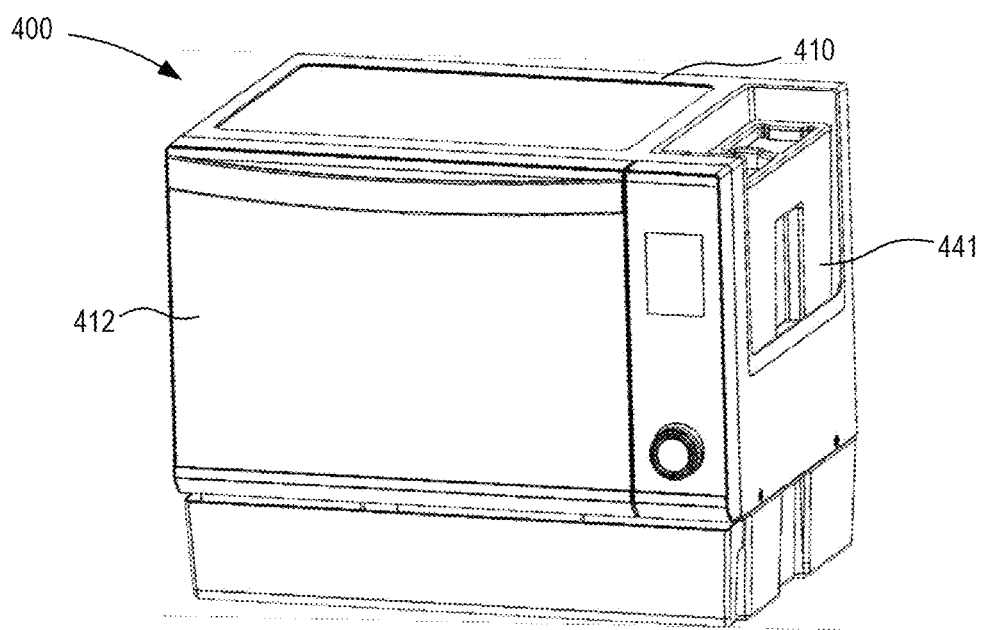
FIGS. 8-11 are various views of a semi-autonomous storage and/or cooking device according to an embodiment.
Figure 9:
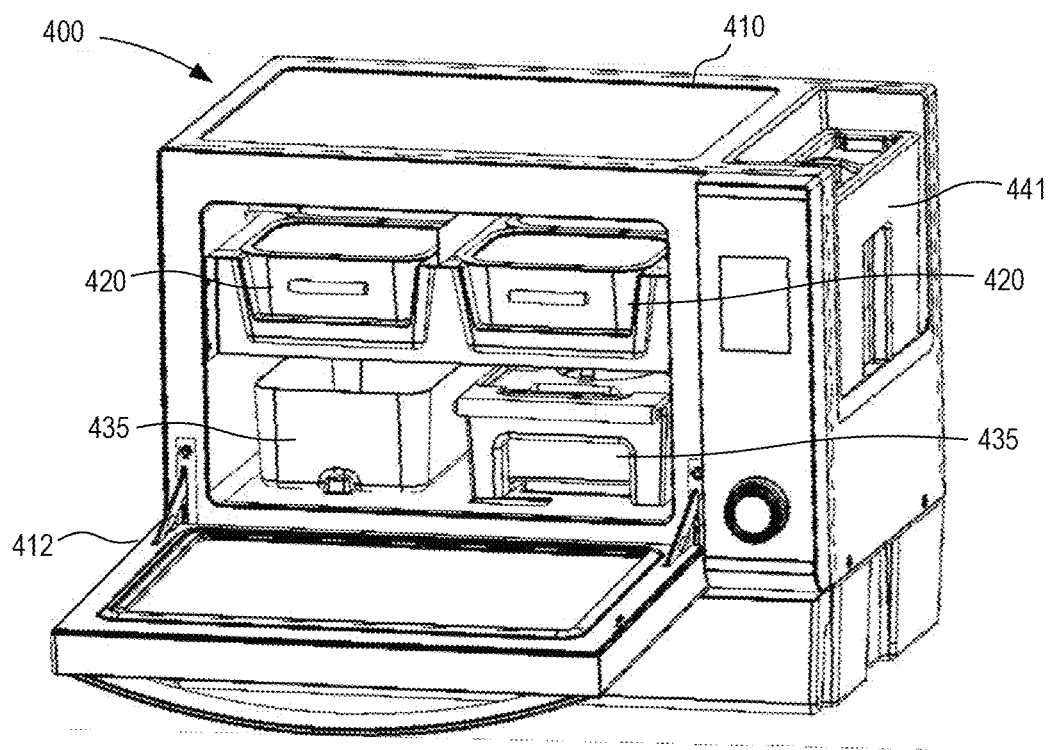

In some embodiments, any of the devices described herein can be used in conjunction with and/or can be disposed in any suitable appliance such as a refrigerator or oven. In such embodiments, the device can utilize any suitable aspect of the appliances as described above with reference to the device 100. For example, as shown in FIGS. 5-7, in some embodiments, a device 300 can be substantially similar to the devices 100 and/or 200 and can be configured for use within, for example, an oven. As shown in FIGS. 5-7, the device 300 can include a connector 301 that can be configured to couple to a corresponding connector of the oven. In some embodiments, such a coupling can include coupling any suitable number of fluid flow paths, any suitable number of mechanical and/or electrical connections, and/or the like. Moreover, while the device 200 includes and/or is disposed in the housing 210, in embodiments configured to be inserted into the oven or other appliance (such as the device 300), the device 300 need not be disposed in an outer housing. In some embodiments, components 302 of the device 300 (e.g., electrical and/or electronic components such as a controller or the like) can be disposed in, for example, a drawer of the oven and/or the like (FIG. 7). In still other embodiments, any of the devices 100, 200, and/or 300 can be incorporated into an appliance (e.g., permanently), thereby forming a combined appliance having any suitable number of functions.

FIGS. 8-11 illustrate a semi-autonomous storage and/or cooking device 400 according to an embodiment. The storage and/or cooking device 400 (also referred to herein as "device") can be any suitable cooking device, machine, and/or system. As described in further detail herein, for example, the device 400 can be configured to receive one or more food items disposed in one or more sealed packages, receive or retrieve information associated with the one or more food items, store the one or more food items at a first temperature (e.g., a storage temperature) prior to cooking, and cook the one or more food items in accordance with the information associated with the food items. In some embodiments, at least a portion of the device 400 can be substantially similar to or the same as the storage and/or cooking devices 100 and 200 described above with reference to FIG. 1 and FIGS. 3 and 4, respectively. Accordingly, portions of the device 400 are not described in further detail herein.

As shown in FIGS. 8-11, the device 400 includes a housing 410, a set of thermal containers 420, and a fluid circulation system 440. Although not shown in FIGS. 8-11, the device 400 can also include a controller and a power supply, which can each be similar in at least form and/or function to the controller 170 and the power supply 173, respectively, described above with reference to FIGS. 1 and 2. As shown, the housing 410 of the device 400 is configured to house and/or at least partially enclose the set of thermal containers 420, the fluid circulation system 440, and/or any other suitable portion of the device 400. Moreover, the device 400 and/or the housing 410 of the device 400 can be configured to receive and/or at least temporarily house one or more food packages 435 selectively positioned within the device 400 and/or within the housing 410 of the device 400.

The housing 410 can be any suitable shape and can have a size suitable for placement on or in, for example, a kitchen countertop, a cabinet, and/or the like. The housing 410 includes a lid, door, and/or access member (referred to herein as "lid 412") that is movably coupled to the housing 410 and that can be transitioned from a closed configuration to an open configuration to allow a user to access the components contained within the housing 410. As described above with reference to the housing 210, the device 400 has a "front-loading" configuration in which moving the lid 412 from the closed configuration (FIG. 8) to the open configuration (FIG. 9) allows access to an inner portion of the housing 410 via a front portion of the device 400.

As described above, at least a portion of the set of thermal containers 420, at least a portion of the fluid circulation system 440, and at least a portion of the controller are configured to be disposed within the housing 410. The thermal containers 420 can be formed of and/or can include any suitable material(s) and/or combinations thereof, as described above with reference to the thermal containers 120 and/or 220. As described above, the arrangement of the thermal containers 420 can allow for independent control of a temperature associated with each thermal container 420 substantially without transferring thermal energy to, for example, adjacent thermal containers 420, or other portions of the device 400. In other words, the device 400 can have, for example, a multi-zone arrangement in which food items disposed in separate thermal containers 420 can be stored and/or cooked independently accordingly to a set of instructions associated with each food item.

Figure 10:
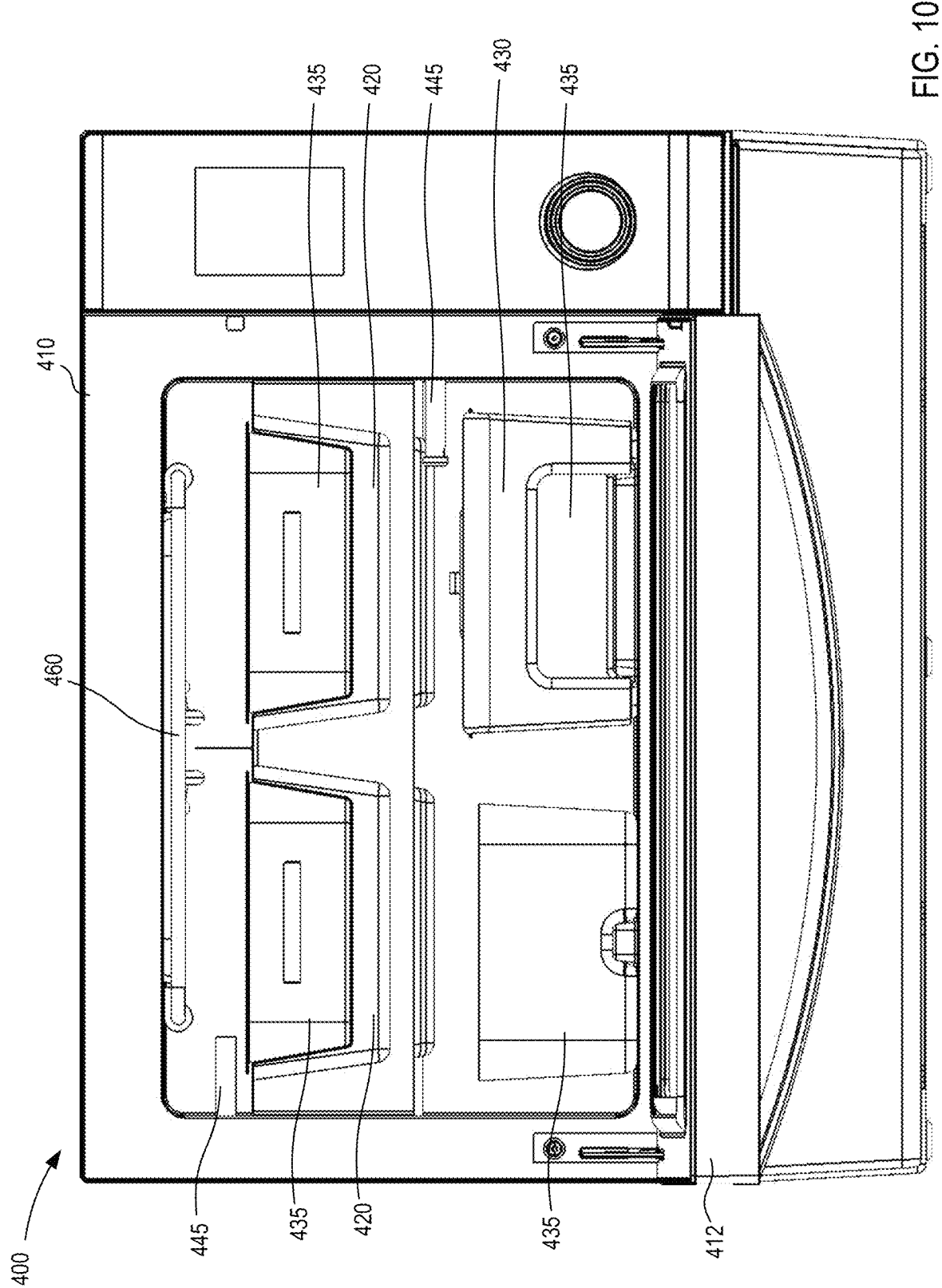
Figure 11:
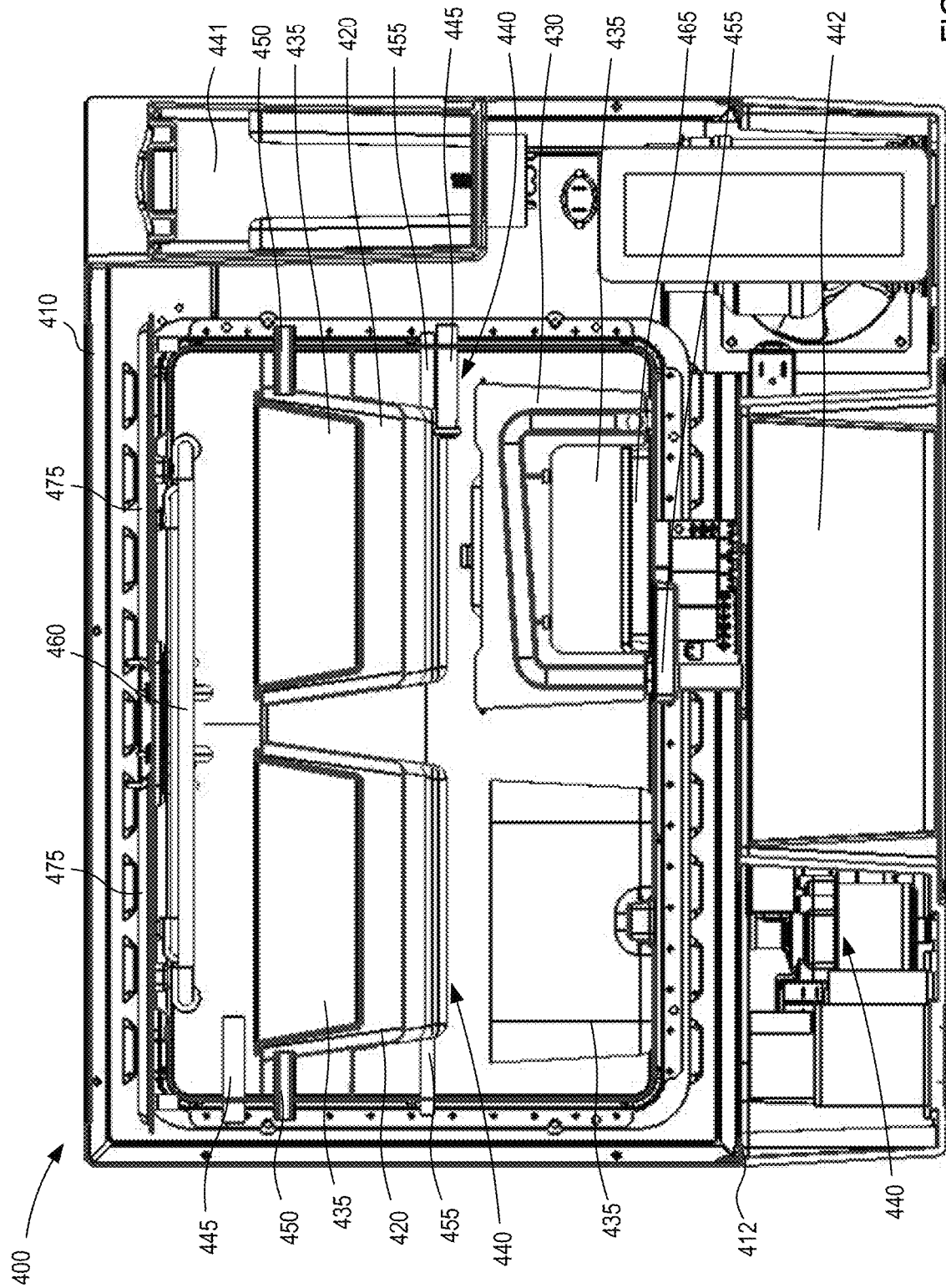

In this embodiment, the device 400 includes two thermal containers 420 (also referred to as a "circulation pan"). Each thermal container 420 or circulation pan is configured to receive one or more food packages 435 (e.g., food cartridges, food containers, food packs, food pans, and/or any other suitable element configured to contain and/or hold one or more food items. For example, in some embodiments, a first circulation pan 420 (e.g., an upper right circulation pan 420 as shown in FIGS. 10 and 11) can be configured to receive a first food package 435 containing a first kind of food (e.g., meats and/or other proteins) and a second circulation pan 420 (e.g., an upper left circulation pan 420 as shown in FIGS. 10 and 11) can be configured to receive a second food package containing a second kind of food (e.g., vegetables). In some instances, one or more food items can be pre-packaged (e.g., within a fluid-tight package or cartridge), which in turn, is/are inserted into one of the circulation pans 420 (see e.g., FIGS. 10 and 11). The food packages and/or cartridges can be any suitable shape, size, and/or configuration. For example, in some embodiments, the food cartridges can be similar in at least form and/or function to the food cartridges described in the '750 publication and/or the '819 application. As shown in FIGS. 10 and 11, the device 400 can also receive a third food package 435 (e.g., a lower right food package 435 as shown in FIGS. 10 and 11) configured to contain a third kind of food (e.g., starches, carbohydrates, and/or the like) and a fourth food package 435 (e.g., a lower left food package 435 as shown in FIGS. 10 and 11) configured to receive a fourth kind of food (e.g., sauces, dressings, etc.).

In some embodiments, the food packages 435 disposed within the circulation pans 420 can be configured to receive thermal energy from and/or transfer thermal energy to a volume of fluid disposed in the a portion of the food package 435 and/or the circulation pans 420 or otherwise flowing through, in, or past the circulation pans 420. For example, in some embodiments, a volume of fluid can be transferred into at least a portion of one or more of the food packages 435 via one or more inlets 445 such that thermal energy can be transferred to and/or from the food items disposed therein. In other embodiments, a volume of fluid can be transferred into and/or can flow through a fluid flow path (defined by the fluid circulation system 440) that is outside of the food packages 435. For example, a volume of fluid can be transferred from one or more inlets 450, into one or more of the circulation pans 420, and out one or more outlets 455. In some embodiments, the fluid can flow from the one or more outlets 455 to one or more drain reservoirs 442 or to any other portion of the fluid circulation system 440 (e.g., flow back to a fluid reservoir 441, flow to a different circulation pan, a different food package 435, and/or the like). In some embodiments, at least a portion of the volume of fluid disposed in the circulation pan(s) 420 can be in contact with an outer surface of the food package(s) 435 disposed therein such that thermal energy can be transferred therebetween. In some embodiments, one or more circulation pans 420 and/or one or more of the food packages 435 can include a siphon arrangement 430 (e.g., the lower right food package 435 shown in FIGS. 10 and 11). The siphon arrangement 430 can be similar to or substantially the same as the siphon arrangement described in detail in the '819 application.

In some embodiments, the device 400 can include circulation pans 420 having any suitable combination of configurations. For example, in some embodiments, the device 400 can include at least one circulation pan 420 configured to receive via an inlet 450 a volume of fluid that is disposed in a volume of the circulation pan(s) 420 in which the food package(s) 435 is/are disposed. Moreover, the fluid circulation system 440 can also be configured to transfer via a different inlet 445 a separate volume of fluid into a volume defined by at least a portion of the food package 435 such that the fluid is in contact with the food item contained in the food package 435 and an outer surface of the food package 435 (e.g., a "double boil" or "double cooking" configuration as described in detail in the '819 application). As such, the food packages 435 and/or the circulation pans 420 can be substantially similar in at least form and/or function to the food cartridges or packages and/or the thermal containers 120 and/or 220 described above with reference to FIG. 1 and/or FIGS. 3 and 4, respectively. Thus, the food packages 435 and circulation pans 420 are not described in further detail herein.

While one or more of the circulation pans 420 are described herein with reference to FIGS. 8-11 as defining a volume that receives a flow of fluid such that the fluid is in contact with an outer surface of the food package 435 disposed therein, in some embodiments, one or more of the circulation pans 420 can have any suitable configuration while providing a similar function or substantially the same function. For example, in some embodiments, the device 400 can include a series of coils or the like that are in contact with the outer surface of one or more of the food packages 435 and through which the fluid circulation system can provide a flow of cooled or heated fluid (e.g., water).

The fluid circulation system 440 of the device 400 can be any suitable shape, size, and/or configuration. The fluid circulation system 440 is configured to regulate a temperature of a working fluid such as, for example, water at least temporarily disposed in a fluid reservoir 441. For example, the fluid circulation system 440 can include any number of fluid conduits, tubing, pipes, valves, solenoids, pumps, and/ or the like configured to place the fluid reservoir 441 in fluid communication with any suitable number of fluid flow paths within the device 400. The fluid circulation system 440 can also include a drain reservoir 442 configured to receive a volume of fluid (e.g., from one or more outlets 455 or one or more fluid flow paths) that has been used to cool and/or heat one or more food items. Moreover, the device 400 and/or the fluid circulation system 440 can include any number of heat exchangers and/or heat exchanger assemblies, heat sinks, heating elements, steamers, heat diffusers, cooling elements, chillers, and/or the like. For example, as shown in FIG. 11, the device 400 and/or the fluid circulation system 440 can include cooling members 475 (e.g., chambers, flow paths, volumes, elements, and/or the like) disposed about the circulation pans 420. In other embodiments, the device 400 and/or the fluid circulation system 440 can include any number of heating members and/or cooling members (e.g., one or more heating elements 460 or cooling members 475, as shown in FIG. 11) disposed in any suitable position and/or otherwise arranged in any suitable configuration. In some embodiments, a series of cooling members 475 (e.g., chambers, flow paths, volumes, elements, etc.) can be arranged within the device 400 such as to circumscribe or substantially circumscribe an inner volume of the device 400 configured to receive the food packages 435.

In some embodiments, the fluid circulation system 440 and/or a portion thereof can be similar in form and/or function to the fluid circulation system 140 and/or 240 described in detail above with reference to FIG. 1 and/or FIGS. 3 and 4, respectively. In some embodiments, the fluid circulation system 440 can be similar in form and/or function to the fluid circulation systems described in detail in the '383 publication, the '750 publication, and/or the '819 application incorporated by reference above. Thus, the fluid circulation system 440 is not described in further detail herein.

As shown in FIG. 11, in some embodiments, the device 400 and/or one or more of the circulation pans 420 can include a heating element 460 and or the like configured to transfer thermal energy to the food item contained therein. For example, in some embodiments, the device 400 can receive an instruction (e.g., from the controller or the like) to heat the heating element 460 to a desired temperature to roast, bake, broil, brown, toast, and/or otherwise cooking the food items via the heating element 460 in addition to or instead of via a heated fluid. In some such embodiments, a cooking procedure can be split, for example, into two operations, as described above. Moreover, while the heating element 460 is particularly shown in FIG. 11, in some embodiments, the device 400 can include any suitable number of heating elements disposed in any desired position within the device 400. For example, in some embodiments, the device 400 can include a heating element in a space and/or portion disposed above or below one or more circulation pans 420 and/or food packages 435. As a specific example, the device 400 can include a heating element in a space 465 below the lower right food package 435 (e.g., a food package containing a starch) shown in FIG. 11.

FIGS. 12-21 illustrate a semi-autonomous storage and/or cooking device 500 according to an embodiment. The storage and/or cooking device 500 (also referred to herein as "device") can be any suitable cooking device, machine, and/or system. As described in further detail herein, for example, the device 500 can be configured to receive one or more food items (e.g., food items disposed in one or more sealed packages, loose food items, and/or the like), receive or retrieve information associated with the one or more food items, store the one or more food items at a desired temperature (e.g., a first temperature such as a cold or cool storage temperature) prior to cooking, and cook and/or warm the one or more food items in accordance with the information associated with each food item.

The device 500 includes a housing 510, one or more thermal containers 520 (also referred to herein as a circulation pan(s)), a fluid circulation system 540, and a controller 570. In some embodiments, at least a portion of the device 500 can be similar to or substantially the same as the storage and/or cooking devices 100, 200, and/or 400 described above. In some embodiments, at least a portion of the device 500 can be similar to or substantially the same as the storage and/or cooking devices described in, for example, the '383 publication incorporated by reference above. Accordingly, similar portions of the device 500 may not be described in further detail herein.

For example, in some embodiments, the controller 570 can be similar in at least form and/or function to the controller 170 described above with reference to FIGS. 1 and 2. As described above with reference to the controller 170, the controller 570 can include any suitable electronic and/or electromechanical device configured to at least semi-autonomously control at least a portion of the device 500. Specifically, the controller 570 can include at least a processor, a memory, and an input/output (I/O) interface, each of which can be similar to and/or substantially the same as those described above with reference to the controller 170. Accordingly, the processor can be configured to run or execute a set of instructions or code stored in the memory associated with the operation of one or more portions of the device 500, and the I/O interface can be configured to send signals to and/or receive signals from the processor and/or any other suitable electric and/or electronic device or component included in the device 500 (e.g., one or more sensors, heat exchangers, heating elements, chillers, compressors, boilers, broilers, steam generators, pumps, valves, solenoids, scanners, etc.).

In some instances, when the device 500 is in a first operating mode, the controller 570 can perform and/or execute one or more processes associated with maintaining one or more food items contained in the device 500 at or below a predetermined temperature (e.g., a refrigeration and/or storage mode). In response to an input (e.g., a user input, an automatic schedule, and/or the satisfaction of one or more criterion), the device 500 can be transitioned to a second operating mode in which the controller 570 can perform and/or execute one or more processes associated with cooking the one or more food items contained in the device 500. In both the first operating mode and the second operating mode, the controller 570 can send signals to and/or receive signals from any number of devices and/or components to transfer thermal energy from the one or more food items (e.g., the cooling or first operating mode) and/or to transfer thermal energy to the one or more food items (e.g., the cooking or second operating mode), as described in further detail herein.

As another example, in some embodiments, the fluid circulation system 540 and/or a portion thereof can be similar in form and/or function to the fluid circulation system 140, 240, and/or 440 described in detail above and/or can be similar in form and/or function to the fluid circulation systems described in detail in the '383 publication, the '750 publication, and/or the '819 application incorporated by reference above.

As described above with reference to the fluid circulation systems 140, 240, and/or 440, the fluid circulation system 540 is configured to regulate a temperature of a working fluid such as, for example, water at least temporarily disposed in a fluid reservoir 541. The fluid circulation system 540 can be any suitable shape, size, and/or configuration and can include any suitable component or combination of components. For example, the fluid circulation system 540 can include any number of fluid conduits, tubing, pipes, valves, solenoids, pumps, and/or the like configured to place the fluid reservoir 541 in fluid communication with any suitable number of fluid flow paths within the device 500. Moreover, the device 500 and/or the fluid circulation system 540 can include any number of heat exchangers and/or heat exchanger assemblies, heat sinks, heating elements, boilers, steamers, heat diffusers, cooling elements, chillers, compressors, evaporators, condensers, and/or the like. The fluid circulation system 540 can also include a drain reservoir 542 configured to receive a volume of fluid (e.g., from one or more outlets or one or more fluid flow paths) that has been used to cool and/or heat one or more food items, as described in further detail herein.

As shown in FIGS. 12-16, the housing 510 of the device 500 is configured to house and/or at least partially enclose the one or more thermal containers 520, the fluid circulation system 540, and/or any other suitable portion of the device 500. Moreover, the device 500 and/or the housing 510 of the device 500 can be configured to receive and/or at least temporarily house one or more food containers selectively positioned within the device 500 and/or within the housing 510 of the device 500, as described in further detail herein.

Figure 12:
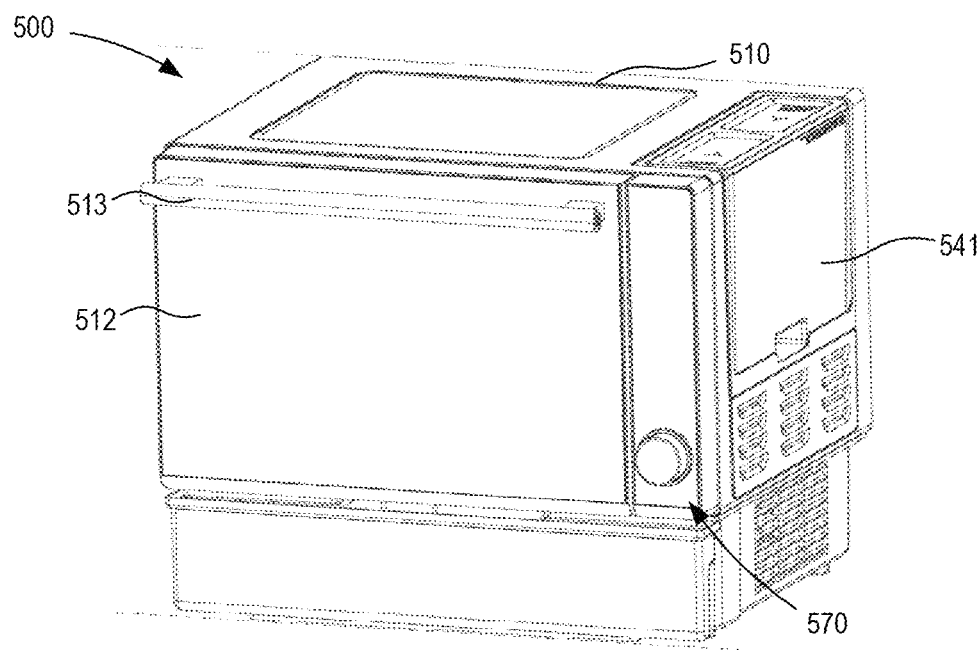
FIGS. 12 and 13 are a perspective view and a right side view, respectively, of a semi-autonomous storage and/or cooking device according to an embodiment.
Figure 13:
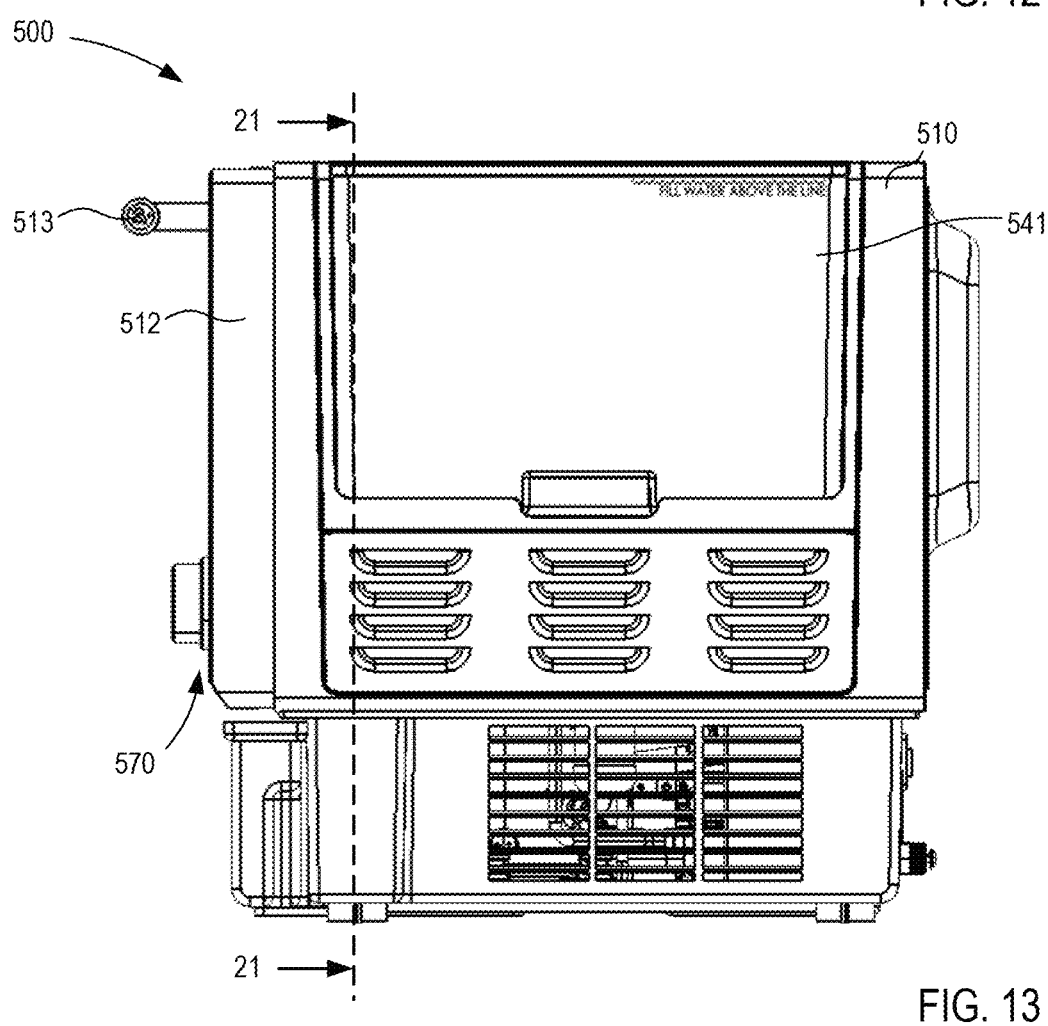
Figure 14:
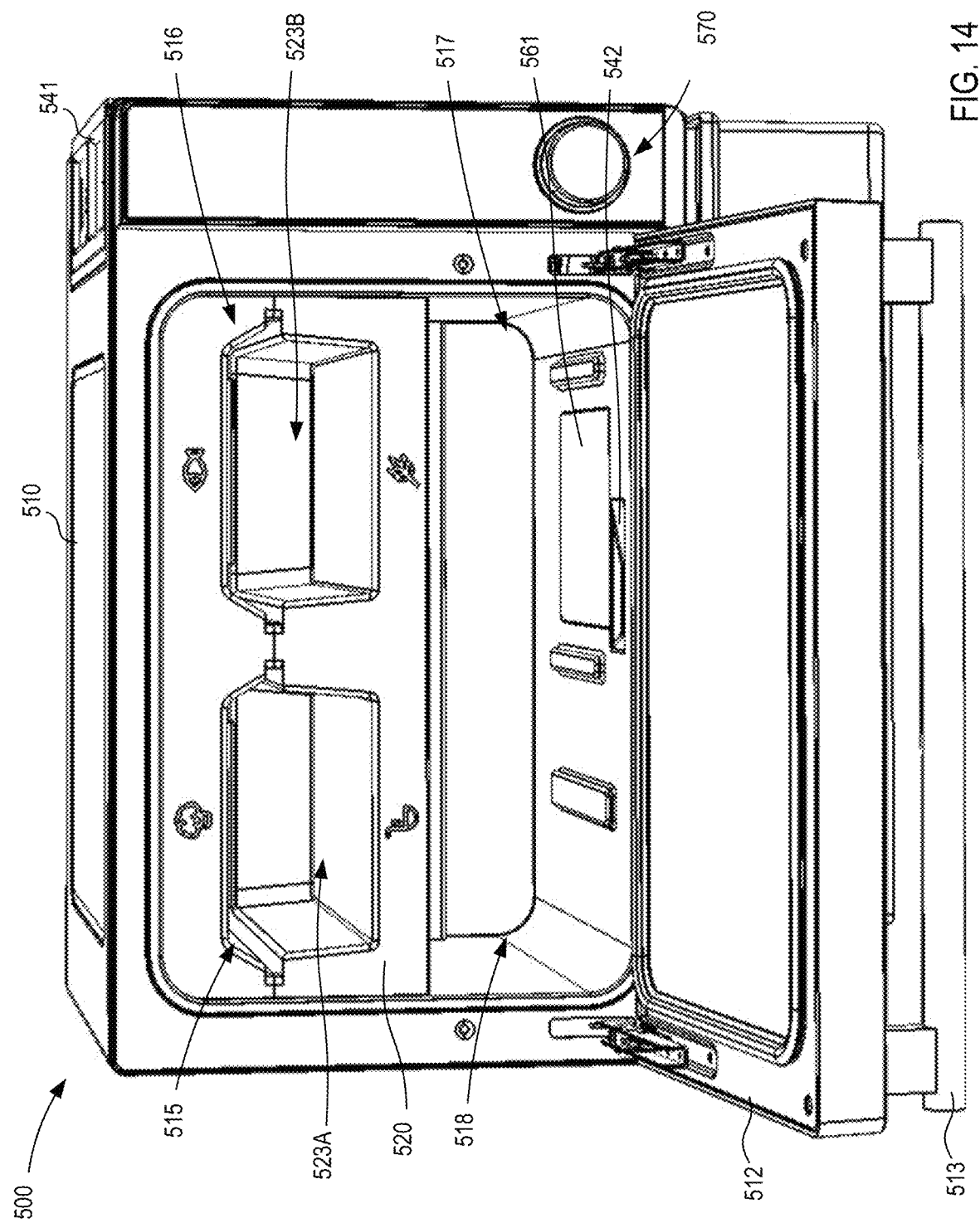
FIG. 14 is a front perspective view of the semi-autonomous storage and/or cooking device of FIG. 12 shown with a lid in an open configuration.

The housing 510 can be any suitable shape and can have a size suitable for placement on or in, for example, a kitchen countertop, a cabinet, and/or the like. As shown in FIGS. 12-14, the housing 510 includes a lid, door, and/or access member (referred to herein as "lid 512") that is movably coupled to the housing 510 and that can be transitioned from a closed configuration to an open configuration to allow a user to access the components contained within the housing 510. More particularly, the lid 512 can have and/or can be coupled to a handle 513, which can be engaged by a user to transition the lid 512 between the open and the closed configurations. As described above with reference to the housings 210 and 410, the device 500 has a "front-loading" configuration in which moving the lid 512 from the closed configuration (FIGS. 12 and 13) to the open configuration (FIG. 14) allows access to an inner portion of the housing 510 via a front portion of the device 500.

Figure 15:
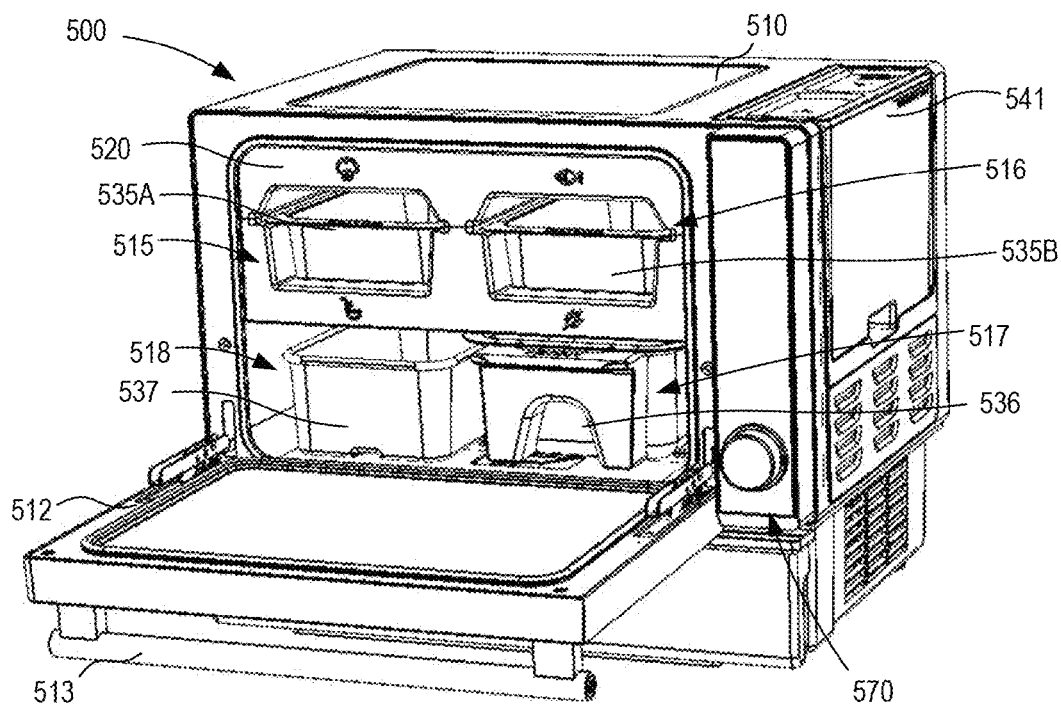
FIGS. 15 and 16 are a perspective view and a front view, respectively, of the semi-autonomous storage and/or cooking device of FIG. 12 shown with the lid in the open configuration and shown with one or more food containers disposed therein.
Figure 16:
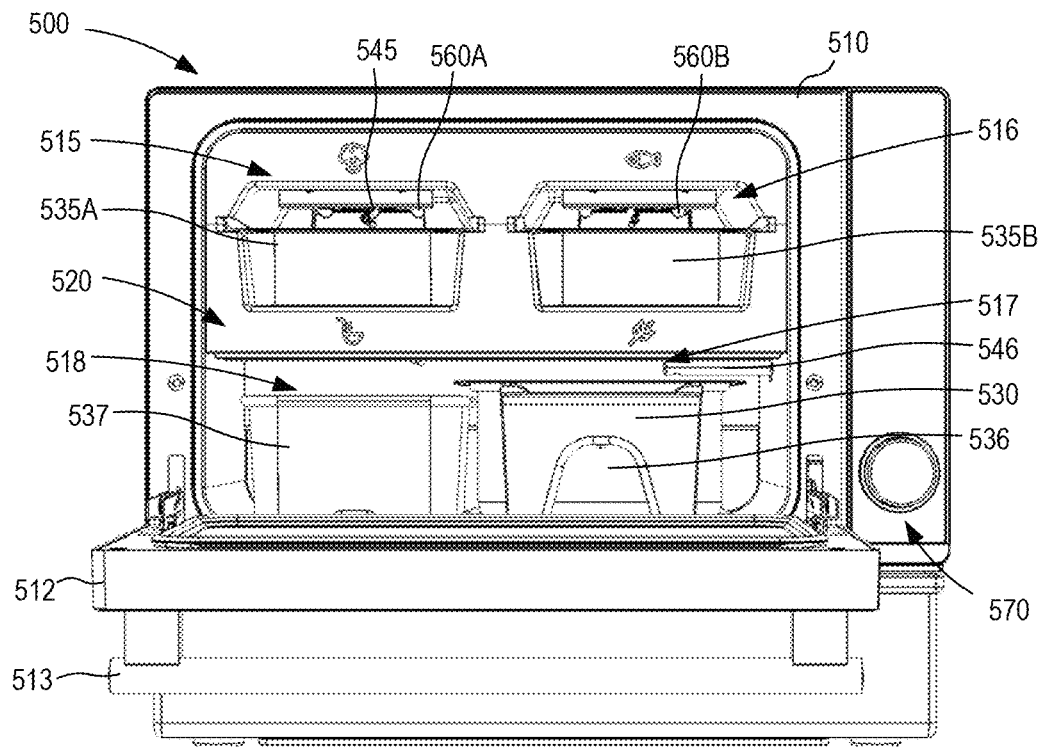

The device 500 and/or the housing 510 includes and/or defines multiple zones, portions of which can be independently controlled to store and/or cook one or more food items based on information and/or instructions associated with the food item(s). As shown in FIG. 14, the device 500 and/or the housing 510 includes and/or defines a first zone 515, a second zone 516, a third zone 517 and a fourth zone 518. In some embodiments, each zone can be configured to receive a given and/or predetermined type of food item. For example, in some embodiments, the first zone 515 can be configured to receive a first food type disposed in a first food container 535A (e.g., a protein such as a meat protein or the like), the second zone 516 can be configured to receive a second food type disposed in a second food container 535B (e.g., a vegetable), the third zone 517 can be configured to receive a third food type disposed in a third food container 536 (e.g., a starch such as pasta, rice, etc.), and the fourth zone 518 can be configured to receive a fourth food type disposed in a fourth food container 537 (e.g., a sauce, condiment, seasoning, etc.), as shown in FIGS. 15 and 16.

While the device 500 is shown and described as having the zones 515, 516, 517, and/or 518 arranged in a particular manner and/or configuration, it should be understood that such a configuration is presented by way of example only and not limitation. While the zones 515, 516, 517, and 518 are described as being configured to receive a food container having and/or receiving a particular type of food item, in other embodiments, each of the zones 515, 516, 517, and/or 518 can include any suitable feature and/or component that can enable that zone to store and/or cook any suitable food item and/or type(s) of food items.

Each zone 515, 516, 517, and/or 518 can include one or more elements and/or features configured to store and/or cook the particular type of food item it receives via one or more modalities. For example, as shown in FIG. 16, the first zone 515 can include an inlet 545 configured to convey a volume of heated fluid (e.g., water) into the food container 535A, and a heating element 560A configured to transfer thermal energy (e.g., via conduction) to the food items disposed in the food container 535A. The second zone 516 can similarly include a heating element 560B configured to transfer thermal energy (e.g., via conduction) to the food items disposed in the food container 535B. The third zone 517 can include an inlet 546 configured to convey a volume of heated fluid (e.g., hot water at or near boiling) in the food container 536, and a heating element 561 (see e.g., FIG. 14) configured to transfer thermal energy (e.g., via conduction) to the food items and/or fluid disposed in the food container 536. In some embodiments, the fourth zone 518 does not include an element(s) and/or feature(s) to store and/or cook the fourth food item that is disposed in the fourth food container 537. In such embodiments, the device 500 can be configured to heat, warm, and/or otherwise transfer thermal energy to the fourth food item disposed in the fourth zone 518 by virtue of an ambient temperature within at least a portion of the housing 510. For example, in some instances, the fourth food container 537 can be configured to receive a sauce or the like that is intended to be warmed. Thus, ambient heat within the housing 510 can be used as a source of thermal energy for warming, for example, the sauce disposed in the fourth food container 537. In other embodiments, the fourth zone 518 can include any suitable element and/or feature such as those described herein.

As described above with reference to the devices 100, 200, and/or 400, the device 500 includes one or more thermal containers 520 configured to receive one or more food containers. More particularly, in the embodiment shown in FIGS. 12-21, the device 500 includes one thermal container 520 (also referred to herein as a circulation pan 520) having a first portion 520A configured to receive the first food container 535A and a second portion 520B configured to receive the second food container 535B. In some embodiments, the first portion 520A of the circulation pan 520 and the first food container 535A can collectively be and/or can collectively form, for example, a first thermal container configured to store and/or cook a first food item. Similarly, in some embodiments, the second portion 520B of the circulation pan 520 and the second food container 535B can collectively be and/or can collectively form, for example, a second thermal container configured to store and/or cook a second food item.

The circulation pan 520 can be formed of and/or can include any suitable material(s) and/or combinations thereof, as described above with reference to the thermal containers (or circulation pans) 120, 220, and/or 420. As described above, the arrangement of the circulation pan 520 can allow for independent control of a temperature associated with each portion 520A and 520B substantially without transferring thermal energy therebetween. In other words, the device 500 can have, for example, a multi-zone arrangement in which food items disposed in the separate portions 520A and 520B can be stored and/or cooked independently accordingly to a set of instructions associated with each food item.

Figure 17:
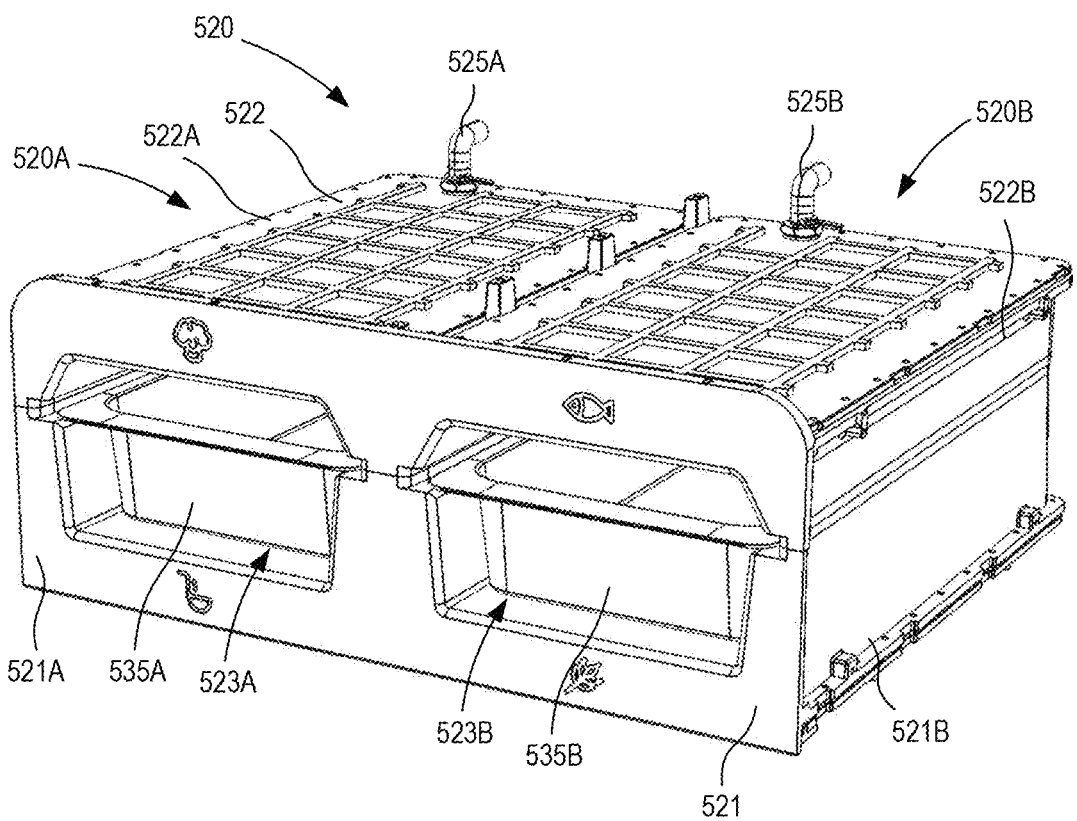
FIG. 17 is a front perspective view of a circulation pan included in the semi-autonomous storage and/or cooking device of FIG. 12.
Figure 18:
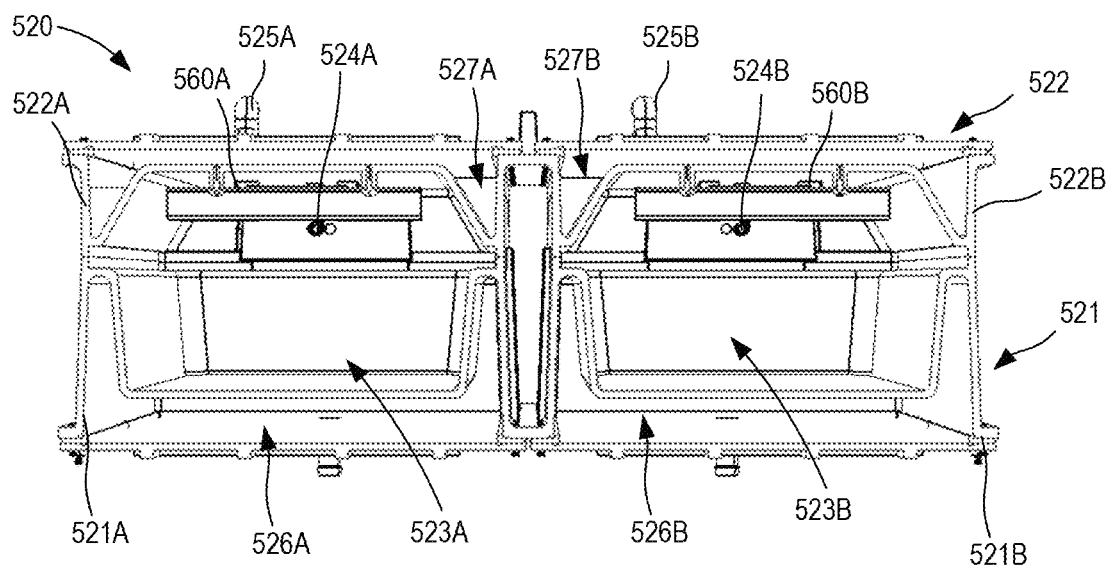
FIG. 18 is a cross-sectional view of the circulation pan shown in FIG. 17.

As shown in FIGS. 17 and 18, the circulation pan 520 includes a first member 521 (e.g., a lower member) and a second member 522 (e.g., an upper member). In some embodiments, the first member 521 and the second member 522 can be coupled together and/or disposed adjacent to each other such that a first portion 521A of the first member 521 and a first portion 522A of the upper member 522 collectively define and/or collectively form an opening, a container, a cavity, a pan, and/or the like (referred to herein as cavity 523A). Similarly, a second portion 521B of the first member 521 and a second portion 522B of the second member 522 collectively define and/or collectively form an opening, a container, a cavity, a pan, and/or the like (referred to herein as food cavity 523B). As described in further detail herein, the food cavity 523A is configured to receive the first food container 535A and the food cavity 523B is configured to receive the second food container 535B (see e.g., FIG. 17).

As shown in FIG. 18, the first portion 521A of the first member 521 defines a first circulation volume 526A and the first portion 522A of the second member defines a first circulation volume 527A. The circulation volumes 526A and 527A of the first portion 520A of the circulation pan 520 surround the food cavity 523A and are configured to receive a volume of fluid circulating through a portion of the fluid circulation system 540. More particularly, the first portion 521A of the first member 521 includes an inlet 550A and an outlet 555A, each of which can be coupled to any suitable plumbing or conduit of the fluid circulation system 540. In turn, the plumbing and/or conduit can be coupled to any suitable solenoid, valve, pump, etc., thereby allowing the fluid circulation system 540 to circulate a volume of fluid through the circulation volume 526A. Similarly, the first portion 522A of the second member 522 includes an inlet 525A and an outlet 526A, which can be coupled to any suitable plumbing or conduit of the fluid circulation system 540, thereby allowing the fluid circulation system 540 to circulate a volume of fluid through the circulation volume 527A.

Figure 19:
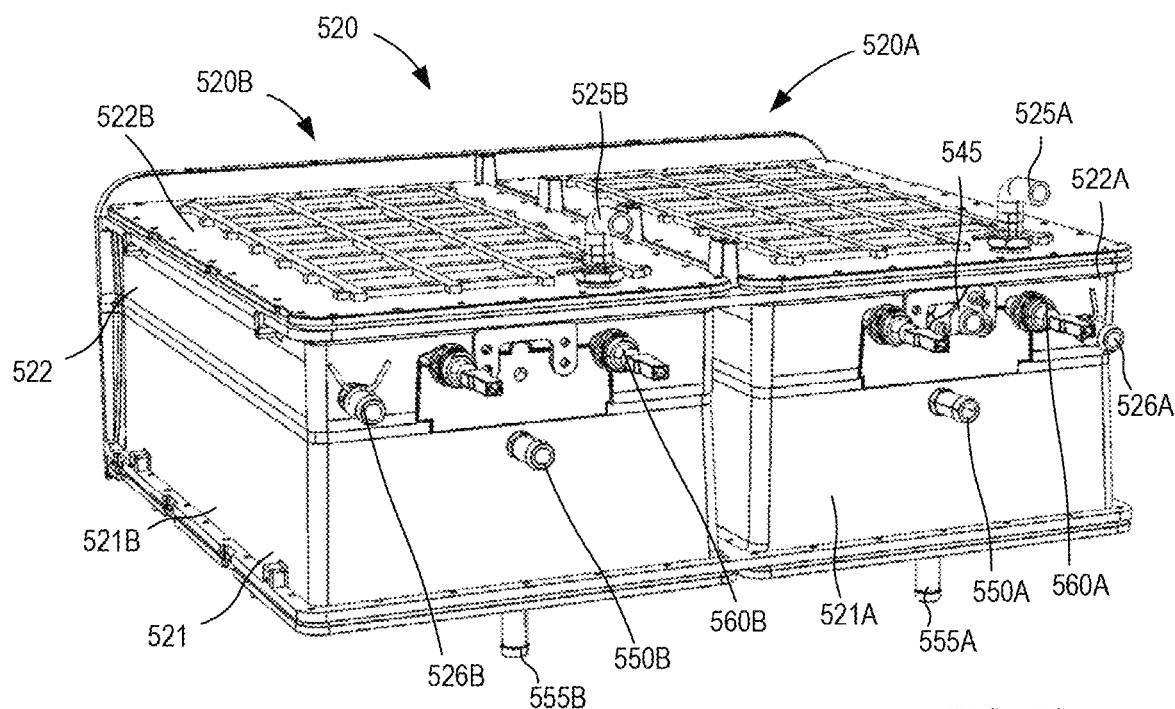
FIG. 19 is a rear perspective view of the circulation pan shown in FIG. 17.

As shown in FIG. 19, the first portion 522A of the second member 522 is coupled to the inlet 545 and the heating element 560. Although not shown, the inlet 545 can be coupled to any suitable plumbing or conduit of the fluid circulation system 540. Moreover, the inlet 545 is configured to extend through the second member 522 to be at least partially disposed within the food cavity 523A (see e.g., FIGS. 16 and 21). Accordingly, the inlet 545 can be configured to convey a volume of fluid into the food container 535A disposed in the food cavity 523A. The heating element 560A can be physically and/or electrically coupled to the controller 570 (and/or a power supply thereof). Similar to the inlet 545, the heating element 560A is configured to extend through the second member 522 to be at least partially disposed within the food cavity 523A (see e.g., FIGS. 16, 18, and 21). Accordingly, in response to a flow of electric power, the heating element 560A can be heated, which in turn, transfers thermal energy to the food items disposed in the food container 535A. In some embodiments, the heating element 560A can be configured to at least partially bake or broil the food items disposed in the food container 535A.

The second portion 520B of the circulation pan 520 can be substantially similar to the first portion 520A of the circulation pan 520. Accordingly, the second portion 521B of the first member 521 defines a second circulation volume 526B similar to but independent of the first circulation volume 526A and the second portion 522B of the second member 522 defines a second circulation volume 527B similar to but independent of the second circulation volume 527A. The circulation volumes 526B and 527B of the second portion 520B surround the food cavity 523B and are configured to receive a volume of fluid circulating through a portion of the fluid circulation system 540. As shown, the second portion 521B of the first member 521 includes an inlet 550B and an outlet 555B and the second portion 522B of the second member 522 includes an inlet 525B and an outlet 526B, which are operable in placing the circulation volume 526B and 527B, respectively, in fluid communication with the fluid circulation system, as described above with reference to the first portion 520A. Moreover, a temperature sensor 524A (e.g., thermometer) can be disposed inside the food cavity 523A and a temperature sensor 524B (e.g., thermometer) can be disposed inside the food cavity 523B, each of which is configured to sense, detect, and/or monitor a temperature within the food cavity 523A and 523B, respectively.

Figure 20:
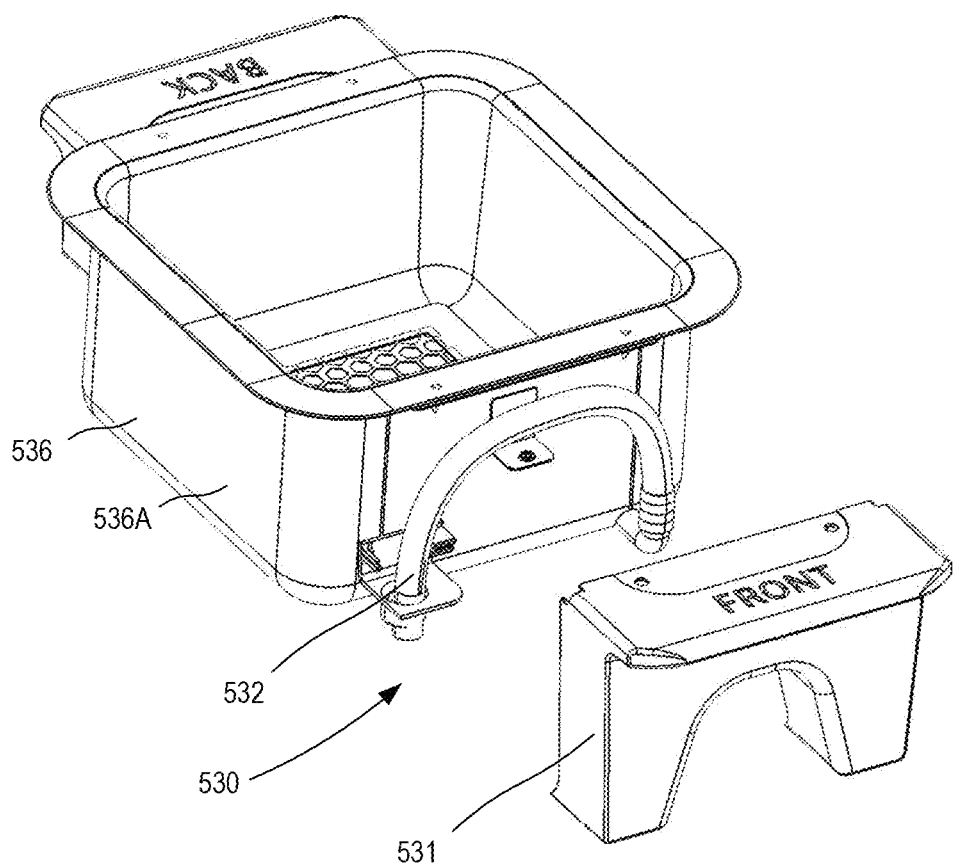
FIG. 20 is a partial exploded view of a food container configured for use within the semi-autonomous storage and/or cooking device of FIG. 12.
Figure 21:
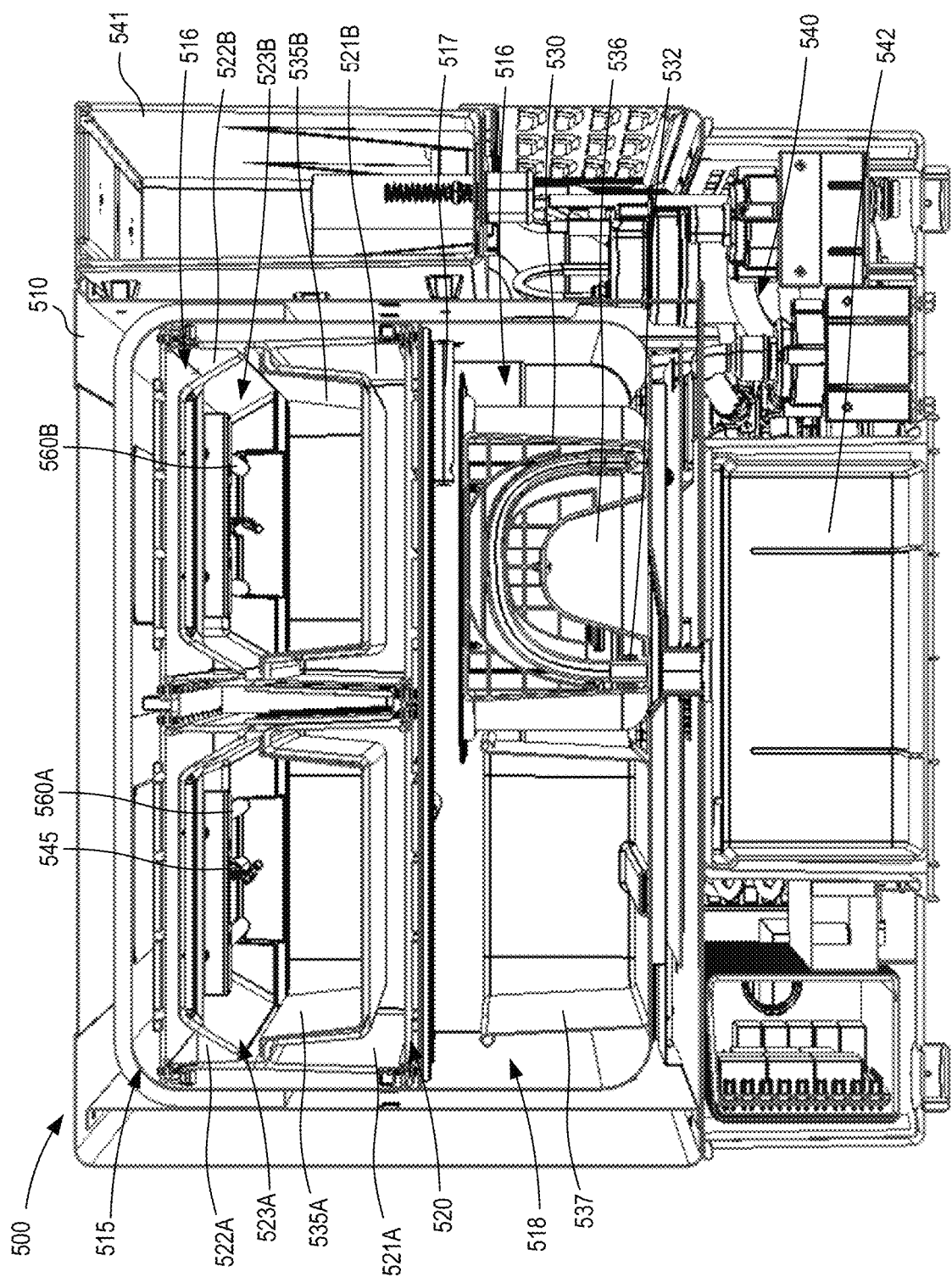
FIG. 21 is a cross-section view of the semi-autonomous storage and/or cooking device taken along the line 21-21 in FIG. 13.

As described above with reference to the first portion 520A, the second portion 522B of the second member 522 is coupled to and/or otherwise includes a heating element 560B at least partially disposed within the food cavity 523B (see e.g., FIGS. 16, 18, and 21). Accordingly, in response to a flow of electric power, the heating element 560B can be heated, which in turn, transfers thermal energy to the food items disposed in the food container 535B, as described above with reference to the first portion 520A. In the embodiment shown in FIGS. 12-21, the second portion 522B of the second member 522 is not coupled to or does not otherwise include an inlet such as the inlet 545 described above with reference to the first portion 522A. For example, in some embodiments, the second zone 516 can be configured to store and/or cook the food items disposed in the food container 535B via one or more modalities that do not include conveying a volume of fluid into the food container 535B. In other embodiments, however, the second portion 522B can include and/or can be coupled to an inlet configured to convey a volume of fluid into the food container 535B disposed in the food cavity 523B.

While the circulation pan 520 is described above as including the lower member 521 with portions 521A and 521B, and the upper member 522 with portions 522A and 522B, in other embodiments, the device 500 can include multiple circulation pans. For example, in such embodiments, the first portion 520A and the second portion 520B of the circulation pan 520 would be formed independently. In some such embodiments, the multiple circulation pans could be coupled together or assembled independently in the housing 510. As such, a device having multiple circulation pans could be functionally similar to or the same as the circulation pan 520.

As described above, the food cavities 523A and 523B are configured to receive the food containers 535A and 535B, respectively. The food containers 535A and/or 535B can be any suitable shape, size, and/or configuration. In some embodiments, the food containers 535A and 535B can be substantially similar while in other embodiments, the food container 535A can have a size, shape, and/or configuration that is different from the food container 535B. Moreover, the arrangement of the food containers 535A and/or 535B can be such that when the food containers 535A and/or 535B are inserted into the food cavities 523A and/or 523B, one or more surfaces of the food containers 535A and/or 535B can be in contact with or can be in relatively close proximity to one or more surfaces of the circulation pan 520. In some embodiments, such an arrangement can facilitate the transfer of thermal energy to or from the one or more food items disposed in the food containers 535A and/or 535B.

In some embodiments, the food containers 535A and/or 535B can be pre-packaged (e.g., within a fluid-tight package or cartridge), which in turn, is/are inserted into one of the food cavities 523A and/or 523B, respectively. For example, in some embodiments, the food containers 535A and/or 535B can be similar in at least form and/or function to the food cartridges described in the '750 publication and/or the '819 application. In some embodiments, the food containers 535A and 535B can be disposable pans, trays, packages, and/or the like. In some instances, such a food container can be sealed prior to use via a removable cover, lid, seal, cellophane, and/or any other suitable packaging, which can be removed when the food container is placed into the device 500. In other embodiments, the food containers 535A and 535B can be reusable pans, trays, and/or the like into which a user can place one or more food items. In other words, the food containers 535A and/or 535B can include pre-packaged foods or can receive one or more loose food items and/or food items that are not otherwise pre-packaged.

In some embodiments, the food container 535A can be configured to receive and/or contain a first type of food such as, for example, a protein and the food container 535B can be configured to receive and/or contain a second type of food such as, for example, a vegetable. In some instances, the food items in the food containers 535A and/or 535B can be packaged according to one or more cooking modalities used to cook that type of food. For example, in some embodiments, the food item contained in the food container 535A (e.g., a protein) can be disposed in a sealed pouch and positioned into the food container 535A and the device 500 can be configured to at least partially cook the food item via fluid immersion cooking (e.g., sous-vide). In other embodiments, the food item need not be contained in a sealed pouch and the device 500 can be configured to at least partially cook the food item via one or more other modalities. In some embodiments, the food item disposed in the food container 535B (e.g., a vegetable) can be loose (e.g., not disposed in an additional packaging such as a pouch) and the device 500 can be configured to cook the food item (e.g., the vegetable) via steaming, roasting, broiling, and/or the like. Moreover, the food items placed in or contained in the food containers 535A and/or 535B can be pre-packaged via a meal preparation and/or delivery service of can be user supplied (e.g., the user places food items bought from a grocery store into the food containers 535A and/or 535B).

As described above, the third zone 517 includes the inlet 546 and the heating element 561 (see e.g., FIG. 14) and is configured to receive the third food container 536 (see e.g., FIGS. 15, 16, 20, and 21). In some embodiments, the third food container 536 can be and/or can form, for example, a third thermal container 520 configured to contain and/or receive a third type of food (e.g., starches, carbohydrates, and/or the like). In some instances, the food item(s) can be pre-packaged and provided via a meal preparation and/or meal delivery service or can be provided by a user. In some instances, the food item(s) can be removed from any packaging or the like and poured and/or positioned in the food container 536. That is to say, the food container 536 can be configured to receive "loose" or unpackaged food items.

The food container 536 disposed in the third zone 517 can be any suitable shape, size, and/or configuration. For example, in some embodiments, the food container 536 can be substantially similar to the food container 535A and/or the food container 535B. In other embodiments, the food container 536 can be similar to and/or substantially the same as, for example, the food containers described in detail in the '819 application. As shown in FIG. 26, the food container 536 includes a container portion 536A configured to receive one or more food items and a siphon portion 530 configured to selectively drain a volume of fluid from the container portion 536A. Although not shown, in some embodiments, the container portion 536A can include an interior screen, a mesh, and/or an at least semi-permeable member configured to allow a fluid to pass through the screen, mesh, and/or semi-permeable member while retaining the food item within a volume defined by the screen, mesh, and/or semi-permeable member.

In some embodiments, the third zone 517 can be configured to cook the food item disposed in the food container 536 via boiling and/or via fluid immersion in a volume of hot or near boiling water. As described above, the third zone 517 includes an inlet 546 (see e.g., FIGS. 16 and 21) that can be coupled to any suitable plumbing and/or conduit of the fluid circulation system 540, which in turn, can be coupled to any suitable solenoid, valve, pump, etc. As such, the device 500 and/or fluid circulation system 540 can be configured to convey a volume of hot fluid (e.g., hot water at or near boiling) into the food container 536 in which the third type of food (e.g., a starch such as pasta, rice, etc.) is disposed, thereby cooking the food item. In addition, the third zone 517 includes a heating element 561 configured to transfer thermal energy to the food item and/or the fluid disposed in the food container 536. In some embodiments, the heating element 561 can be, for example, a positive temperature coefficient (PTC) heater and/or any other suitable heater. In some embodiments, the food container 536 can be disposed in the third zone 517 such that a surface of the food container 536 is in contact with and/or is in close proximity to the heating element 561. As such, in some instances, the fluid circulation system 540 can be configured to convey a volume of fluid into the food container 536 at a first temperature (e.g., below a boiling temperature of the fluid) and the heating element 561 can be configured to transfer additional thermal energy to the volume of fluid to increase a temperature of the volume of fluid (e.g., near, at, or above a boiling temperature of the fluid), as described in further detail herein.

As shown in FIG. 20, the siphon 530 is coupled to and/or integrally formed with the container portion 536A. In some embodiments, the siphon 530 includes a siphon tube 532 and a cover 531 configured to cover and/or protect the siphon tube 532. The siphon tube 532 is in fluid communication with the container portion 536A via an outlet (not shown) disposed at or near a bottom portion of thereof. As described in detail in the '819 application, the siphon 530 can be configured to drain at least a portion of fluid disposed in the container portion 536A in response to a volume of the fluid exceeding a predetermined and/or threshold volume. For example, in some embodiments, a predetermined and/or desired volume of fluid can be conveyed (e.g., via the inlet 546) into the container portion 536A. The predetermined volume of fluid can be sufficient to submerge the food item disposed in the container portion 536A but insufficient to initiate a siphoning (e.g., draining) of the predetermined volume. Thus, the predetermined volume of fluid can be configured to cook the food item (e.g., a pasta or the like). After cooking the food item a desired amount, an additional volume of fluid can be conveyed into the container portion 536A (e.g., via the inlet 546), which increases the volume of fluid in the container portion 536A to an extent that the volume therein exceeds a threshold volume of fluid sufficient to trigger and/or initiate the siphon 530. Accordingly, the siphon 530 can be configured to drain fluid from the container portion 536A into, for example, the drain reservoir 542 (see e.g., FIGS. 14 and 21) in response to an increase in a volume of the fluid disposed therein.

As described above, the fourth zone 518 of the device 500 and/or housing 510 is configured to receive a fourth food container 537. The food container 537 can be any suitable shape, size, and/or configuration. In some embodiments, the food container 537 can be similar to and/or substantially the same as any of the food containers 535A, 535B, and/or 536 described herein. More particularly, in the embodiment shown in FIGS. 12-21, the food container 537 can be a pan, tray, bin, receptacle, and/or any other suitable container. In some embodiments, the food container 537 can be disposable while in other embodiments, the food container 537 can be washable and reusable. In some embodiments, the food container 537 is configured to receive one or more packaged food items (e.g., food items in a separate or additional pouch, bag, container, cup, etc.). For example, as described above, the food container 537 can be configured to receive the fourth type of food such as a sauce, dressing, seasoning, topping, condiment, and/or the like, which in turn, can be disposed in a disposable package such as a pouch or the like.

The device 500 can be configured to transfer thermal energy to or from the food item(s) disposed in the food container 537 via any suitable modality. For example, in the embodiment shown in FIGS. 12-21, the fourth zone 518 can be configured to transfer thermal energy between the food item disposed in the food container 537 and the ambient environment within at least a portion of the housing 510. More particularly, when the device 500 is in a first or storage operating mode, a cold or cool fluid can be circulated through a portion of the circulation pan 520, which in turn, can lower an ambient temperature within the housing 510. Thus, when the device 500 is in the first operating mode, the relatively cool ambient temperature can cool the food item disposed in the food container 537. Conversely, when the device is in a second or cooking operating mode, a hot or heated fluid can be circulated through a portion of the circulation pan 520, which in turn, can increase an ambient temperature within the housing 510. Thus, when the device 500 is in the second operating mode, the relatively warm ambient temperature can warm the food item disposed in the food container 537. While the fourth zone 518 is described as transferred thermal energy between the food item disposed in the food container 537 and the ambient environment within at least a portion of the housing 510, in other embodiments, the fourth zone 518 can include any of the components and/or features described above with reference to the zones 515, 516, and/or 517.

Described below is one example of the device 500 in operation. In some embodiments, a user can provide information associated with one or more food items to be stored and/or cooked in the device 500. In some instances, for example, the one or more food items can be pre-packaged food items provided by a meal preparation and/or delivery service. In such embodiments, the packages and/or food containers can include a communication tag or device can be communicate with the controller 570 when placed within a predetermined proximity to a scanner or reader of the controller 570. For example, in some embodiments, the packages and/or food containers can include an RFID tag, a QR code, a bar code, an NFC tag or device, and/or the like (e.g., as described above and/or as described in the '383 publication, the '750 publication, and/or the '819 application incorporated by reference above). In other embodiments, the food item(s) need not be pre-packaged and/or otherwise disposed in a package or container having a communication tag or device. In such embodiments, the user can provide an input into the controller 570 to, for example, identify the food items. For example, the user can manipulate a user interface of the controller 570 to select the food items from a list of food items. In other instances, the user can manipulate a remote control device such as a mobile device, a smartphone, a tablet, a computer, a smart home digital assistant, and/or the like using an application, program, web browser, and/or the like.

Once the controller 570 has identified the food items, the food items can be disposed in the food containers and/or the food containers can be inserted into the device 500. For example, as described above, one or more proteins can be disposed in the food container 535A, which in turn, is inserted into the food cavity 523A (e.g., in the first zone 515); one or more vegetables can be disposed in the food container 535B, which in turn, is inserted into the food cavity 523B (e.g., in the second zone 516); one or more starches or carbohydrates (e.g., pasta) can be disposed in the food container 536 and inserted into the third zone 517; and one or more sauces, dressings, toppings, etc. can be disposed in the food container 537 and inserted into the fourth zone 518.

In some instances, a user can provide an input into to the controller 570 (e.g., directly via a user interface of the controller 570 or via a remote device such as a mobile device, smartphone, tablet, computer, smart home digital assistant, etc.) that can initiate the device 500. In some instances, the user can choose to have the device 500 cook the food items right away. In response to the user input, the controller 570 can place the device 500 in the second operating mode (e.g., the cooking operating mode) in which the device 500 cooks the food items according to instructions associated with the identified food items, as described in further detail herein.

In other instances, the user can input a desired time at which he or she would like to eat the food items. In such instances, the controller 570 can determine a time at which one or more cooking operations should be performed so that the food items are cooked and ready to eat at the desired time. In some instances, prior to cooking the food items, the controller 570 can be configured to place the device 500 in the first operating mode (e.g., the storage operating mode) in which the device 500 stores the food items for a desired period of time. For example, in some instances, the device 500 and/or the fluid circulation system 540 can cool a volume of fluid (e.g., at least a portion of the fluid in the fluid reservoir 541) and can circulate the volume of cooled fluid through the fluid circulation system 540 and, for example, the circulation volumes 526A and 527A in the first zone 515 and the circulation volumes 526B and 527B in the second zone 516. Accordingly, thermal energy can transfer from the relatively warmer food items disposed in the food container 535A to the relatively cooler volume of fluid circulating through the circulation volumes 526A and 527A and from the relatively warmer food items disposed in the food container 535B to the relatively cooler volume of fluid circulating through the circulation volumes 526B and 527B. In some instances, the food items disposed in the food containers 535A and/or 535B can be cooled to a desired refrigeration temperature such as, for example, about 40° F.

As described above, the cool fluid circulating through the circulation pan 520 (e.g., through the first zone 515 and the second zone 516) can reduce an ambient temperature within at least a portion of the housing 510. The relatively cool ambient temperature within the housing 510 can, in turn, be operable in cooling the food items disposed in the food containers 536 and/or 537. More particularly, in some embodiments, the food item disposed in the third zone 517 can be, for example, a dry pasta or other dry starch, which generally is not a refrigerated food item. Likewise, the food item disposed in the fourth zone 518 can be, for example, a sauce or the like that can be pre-packaged in a sealed pouch or container, thereby reducing and/or removing a need to refrigerate the food item. As such, the cooling of the food items disposed in the third zone 517 and/or the fourth zone 518 via the relatively cool ambient environment within the housing 510 can be sufficient for the give food types and/or items.

In some instances, the controller 570 can be configured to transition the device 500 from the first operating mode to the second operating. For example, in some instances, the controller 570 can transition the device 500 in response to one or more criterion being satisfied. Such a criterion can be, for example, a predetermined time at which to begin cooking, a user provided input (directly or via a remote device such as a smart phone, tablet, computer, smart home digital assistant, and/or the like), and/or any other suitable criterion. Accordingly, the controller 570 can execute one or more processes associated with placing the device 500 in the second operating mode.

In some instances, the device 500 and/or the fluid circulation system 540 can heat a volume of fluid (e.g., a portion of the cooled fluid or a separate volume of fluid from the fluid reservoir 541) and can circulate the volume of heated fluid through the fluid circulation system 540 and, for example, at least the circulation volumes 526A and 527A in the first zone 515. Accordingly, thermal energy can transfer from the relatively cooler food items disposed in the food container 535A to the relatively warmer volume of fluid circulating through the circulation volumes 526A and 527A (see e.g., FIG. 21). In some instances, the device 500 and/or the fluid circulation system 540 can also convey a volume of the heated fluid to the inlet 545 (see e.g., FIG. 21), which in turn, conveys the volume of heated fluid into the food container 535A disposed in the first zone 515 such that the food item (e.g., protein) is at least partially submerged or immersed in the volume of fluid in the food container 535A. As such, the volume of fluid disposed in the food container 535A can transfer thermal energy to the food item disposed therein. In addition, the volume of fluid circulating through the circulation volumes 526A and 527A can transfer thermal energy to the food item and the volume of fluid disposed in the food container 535A. In some instances, the thermal energy transferred from the fluid circulating through the circulation volumes 526A and 527A can consistently maintain the volume of fluid in the food container 535A at a predetermined and/or desired temperature, which would otherwise be subject to loss due to heat transfer to the food item and/or the ambient environment. Accordingly, in this example, the device 500 can be configured to cook the food item disposed in the first zone 515 via fluid immersion or sous-vide.

The device 500 and/or the fluid circulation system 540 can also heat a volume of fluid (e.g., a portion of the heated fluid circulating through the first zone 515 or a separate volume of fluid from the fluid reservoir 541) and can circulate the volume of heated fluid through the first circulation system 540 and, for example, at least the circulation volumes 526B and 527B in the second zone 516 (see e.g., FIG. 21). Accordingly, thermal energy can transfer from the relatively cooler food items disposed in the food container 535B to the relatively warmer volume of fluid circulating through the circulation volumes 526B and 527B. As such, the second zone 516 can be configured to bake or roast the food items disposed in the food container 535B. Although not shown herein, in some embodiments, the second zone 516 can include a steam outlet or the like configured to convey a volume of steam into the food container 535B to steam the food items disposed therein. Such a steam outlet can be fluidically coupled to the fluid circulation system 540 and can receive a flow of steam from one or more portions of the fluid circulation system 540 (e.g., a steam generator or the like).

The device 500 and/or the fluid circulation system 540 can also heat a volume of fluid (e.g., a portion of the heated fluid circulating through the first zone 515 and/or the second zone 516, or a separate volume of fluid from the fluid reservoir 541) and can convey the volume of heated fluid to, for example, the inlet 546 disposed in the third zone 517 (see e.g., FIG. 21). Accordingly, a desired volume of heated fluid can be transferred into the food container 536 that is sufficient to substantially submerge the food item(s) disposed therein without triggering and/or initiating the siphon 530. As described in detail above, in some instances, the heated fluid can have a temperature at or near boiling, thereby boiling the food item disposed in the food container 536. In other embodiments, the heated fluid can have a temperature below boiling and the heating element 561 can be configured to transfer thermal energy to the volume of fluid in the food container 536 to raise a temperature of the volume of fluid to a temperature near, at, or above a boiling temperature of the fluid (e.g., about 212° F. for water). Accordingly, third zone 517 can be configured to boil or substantially boil the food items disposed in the food container 536.

In some instances, after the food items in the food container 536 have been cooked for a desired time and/or a desired amount, the device 500 and/or the fluid circulation system 540 can be configured to convey an additional volume of fluid into the food container 536. As described above, the increase in the volume of fluid can be sufficient to trigger and/or initiate the siphon 530 such that the volume of fluid is drained (via the siphon tube 532) from the food container 536 and into the drain reservoir 542 (see e.g., FIG. 21).

The device 500 is further configured to transfer thermal energy to the food item disposed in the fourth zone 518. As described above, in some embodiments, the fourth zone 518 is configured to transfer thermal energy between the food item(s) disposed therein and at least a portion of the ambient environment within the housing 510. Accordingly, as the device 500 transfers and/or circulates a volume of heated fluid to or through at least one of the first zone 515, the second zone 516, and/or the third zone 517, at least a portion of the thermal energy associated with the circulating fluid is transferred to the ambient environment in the housing 510, thereby raising an ambient temperature. As described above, in some instances, the relatively warm ambient temperature can, in turn, be operable in warming the food item(s) disposed in the food container 537 positioned in the fourth zone 518.

In some instances, the device 500 can circulate heated fluid through the first zone 515, the second zone 516, and/or the third zone 517 at substantially the same time. Moreover, in some embodiments, the fluid circulating through the first zone 515, second zone 516, and/or third zone 517 can flow through one or more similar flow paths and/or can be at least partially shared between the zones 515, 516, and/or 517. In other embodiments, the fluid circulation system 540 can independently control and/or circulate separate volumes of fluid flowing through each of the zones 515, 516, and/or 517. In other words, the device 500 can convey, circulate, and/or maintain a volume of fluid in the first zone 515 at a predetermined temperature and for a predetermined time according to the cooking instructions associated with the food item disposed in the first zone 515; the device 500 can convey, circulate, and/or maintain a separate volume of fluid in the second zone 516 at a predetermined temperature and for a predetermined time according to the cooking instructions associated with the food item disposed in the second zone 516; and the device 500 can convey, circulate, and/or maintain a separate volume of fluid in the third zone 517 at a predetermined temperature and for a predetermined time according to the cooking instructions associated with the food item disposed in the third zone 517.

In some instances, the device 500 can be configured to transfer thermal energy to and/or otherwise to at least partially cook the food items disposed in the first zone 515 and the second zone 516 via the heating elements 560A and 560B, respectively. For example, in some instances, after a desired amount of cooking of the food item dispose in the first zone 515 via a first modality (e.g., sous-vide), the device 500 can be configured to drain the volume of fluid from the food container 535. In other instances, the device 500 can be configured to provide a notification or the like to the user indicative of the device 500 completing the desired amount of cooking via the first modality. In response, the user can remove the food container 535A (e.g., the device 500 can automatically pause one or more operations to allow the user to remove the food container 535A) and can drain the fluid from the food container 535A (e.g., by pouring the fluid into the drain reservoir 542 and/or into a sink or basin external to the device 500. Once drained and replaced in the food cavity 523A, the device 500 can be configured to supply a flow of electric power to the heating element 560A operable to energize or heat the heating element 560. In some instances, the device 500 can be configured to heat the heating element 560A to a desired temperature and for a desired amount of time sufficient to finish cooking the food item disposed in the food container 535A. In some instances, the use of the heating element 560A can result in a desirable color of the food item, one or more portions becoming crisp, and/or the like.

In some instances, the device 500 can be configured to transfer thermal energy to and/or otherwise to at least partially cook the food items disposed in the second zone 516 in a substantially similar manner as described above with reference to the first zone 515. In some instances, the cooking modality used to at least partially cook the food item disposed in the second zone 516 does not include submerging the food item in a volume of fluid (e.g., is not a sous-vide cooking modality). Accordingly, in some instances, the device 500 need not drain a volume of fluid from the food container 535B and as such, the device 500 can be configured to supply a flow of electric power to the heating element 560B to finish cooking the food item disposed in the food container 535B (as described above with reference to the first zone 515).

In some instances, the device 500 can be configured to cook at least the food items disposed in the first zone 515 and the second zone 516 is an at least partially parallel process such that a desired amount of cooking of the food items is completed at substantially the same time. In such instances, the device 500 can be configured to provide a notification or the like indicative of the device 500 completing the desired amount of cooking. As described above, in response to the notification, the device 500 or the user can drain the volume of fluid from the food container 535A and once drained (and replaced in the food cavity 523A), the device 500 can supply a flow of electric power to the heating elements 560A and 560B, thereby transferring thermal energy to the food items disposed in the first zone 515 and the second zone 516 at substantially the same time.

In some instances, the device 500 can be configured to cook the food items disposed in at least two or more of the first zone 515, the second zone 516, the third zone 517, and/or the fourth zone 518 via the same or different modalities based on the cooking instructions associated with the food items. In some instances, the predetermined temperatures and/or the predetermined times can be similar or different based on the cooking instructions associated with the food items and can be performed at substantially the same time, at least partially in parallel, or performed serially. Furthermore, in some instances, the device 500 can be configured to finish cooking (or finish a step of cooking) the food items disposed in the first zone 515, second zone 516, third zone 517, and/or fourth zone 518 at substantially the same time. Accordingly, the user can remove the food items from the device 500 and can eat the freshly cooked food items while still warm.

In this manner, the controller 570 can control one or more portions of the device 500 to cook and/or heat one or more food items at or to a desired temperature and for a desired amount of time. Moreover, in some instances, the controller 570 can be configured to maintain the one or more food items at a predetermined warming temperature (e.g., a temperature below a cooking temperature) after cooking the food item(s) until the user removes the food item(s) from the device 500.

Figure 22:
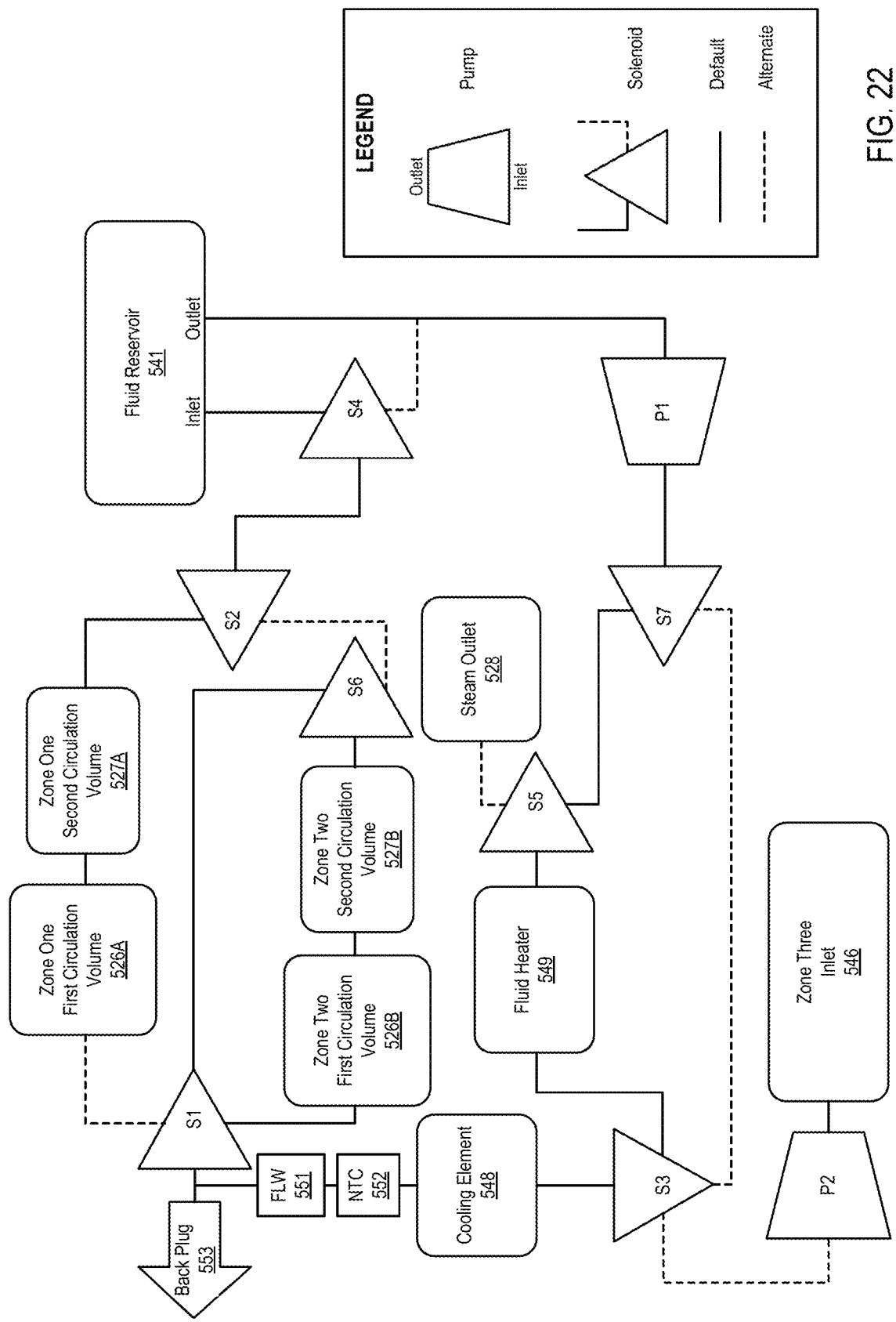
FIG. 22 is a diagram illustrating an example of a fluid circulation system included in the semi-autonomous storage and/or cooking device of FIG. 12.

FIG. 22 is a diagram illustrating a configuration of, for example, the fluid circulation system 540. As described above and as shown in FIG. 22, the fluid circulation system 540 includes a fluid reservoir 541, a cooling element 548, a fluid heater 549, a flowmeter 551 (labeled "FLW" 551 in FIG. 22), a temperature sensor 552 (labeled "NTC" 552 in FIG. 22), a series or set of solenoids S1-S7, and a series or set of pumps P1-P2. The cooling element 548 can be any suitable cooling element such as those described herein. In some embodiments, for example, the cooling element 548 can be and/or can include a plate heat exchanger (PHE) or the like. The fluid heater 549 can be any suitable heating element such as those described herein. For example, in some embodiments, the fluid heater 549 can be a flow through tube heater and/or or the like rather than a boiler (which can be a separate component or not included in the fluid circulation system 540). The flowmeter 551 can be any suitable fluid flow sensor configured to detect a flow of fluid. In some instances, the flowmeter 551 can be configured to sense, for example, a rate of fluid flow or lack thereof (e.g., when excessive air is in the system and/or a freezing condition in which frozen fluid prevents fluid flow. The temperature sensor 552 can be any suitable temperature sensor, thermometer, thermistor, and/or the like. For example, in some embodiments, the temperature sensor 552 can be a negative temperature coefficient (NTC) thermistor or the like. As shown in FIG. 22, the fluid circulation system 540 can also include a plug 553 (labeled as "Back Plug" 553). The plug 553 can be a manual plug or the like that a user and/or technician can use for manually draining fluid from the fluid circulation system 540.

The fluid reservoir 541 can be, for example, a removable tank configured to receive a volume of fluid used during one or more storage and/or cooking processes such as those described in detail herein. As shown in FIG. 22, the fluid reservoir 541 can include an outlet and an inlet. The outlet is configured to supply a flow of fluid that is circulated through the fluid circulation system 540. The inlet is configured to allow for a return flow of fluid into the fluid reservoir. In addition, including an inlet (or recirculation port or portion) can allow a volume of air to be introduced into the fluid circulation system 540, which in some embodiments, can facilitate draining and/or any other suitable operation of the fluid circulation system 540.

In some embodiments, the pump P1 can be configured to pump and/or direct a flow of fluid in a normal or default circulation loop. As such, the pump P1 can be primed directly by the fluid reservoir 541 and can direct a flow of fluid in a clockwise direction along the diagram. The pump P2 can be used to pump and/or direct a flow of fluid from the first zone 515 and/or the second zone 516 to the third zone 517 (e.g., to the inlet 546 configured to convey fluid to the food container 536, as described above with reference to FIG. 21).

In some embodiments, the solenoid S1 can be configured to control and/or direct a flow of fluid into at least one of the first zone 515 or the second zone 516. More specifically, the solenoid S1 can control a flow of fluid into the first circulation volume 526A and the second circulation volume 527A of the first zone 515 and/or into the first circulation volume 526B and the second circulation volume 527B of the second zone 516. In some embodiments, the default mode can be to route a flow of fluid to the circulation volumes 526B and 527B of the second zone 516. In some instances, however, the solenoid S1 can be activated to route a flow of fluid to the first zone 515 or to the first zone 515 and the second zone 516.

In some embodiments, the solenoid S2 can be used to control and/or direct a flow of fluid from either the first zone 515 and/or the second zone 516 back to the fluid reservoir 541 or through one or more other portions of the fluid circulation system 540. In some instances, the use of the solenoid S2 can limit and/or substantially prevent a mixing of the volume of fluid flowing through the first zone 515 and the volume of the fluid flow through the second zone 516 (e.g., as may happen through the use of a Y-connector or the like). As such, the first zone 515 and the second zone 516 can be kept substantially thermally and fluidically isolated. In some embodiments, the default mode can be to route a flow of fluid received from the circulation volumes 526B and 527B of the second zone 516. In some instances, however, the solenoid S2 can be activated to route a flow of fluid from the first zone 515 and/or the second zone 516.

In some embodiments, the solenoid S3 is configured to control and/or direct a flow of fluid to and/or from the cooling element 548 and to and/or from the fluid heater 549. For example, when the solenoid S3 is in the default mode, the solenoid S3 can allow and/or can direct a flow of fluid through the normal circulation path in which fluid flows from the pump P1, through the cooling element 548, the fluid heater 549, or both, into the circulation volumes of at least one of the first zone 515 and/or the second zone 516 and back to the pump P1. In some instances, the solenoid S3 can be activated to control and/or direct fluid flow from the first zone 515 and/or the second zone 516 to the pump P2, which conveys the fluid to the inlet 546 of the third zone 517. In other instances, the solenoid S3 can be activated in conjunction with the solenoid S5 (described below) to block a volume of fluid in the fluid heater 549, which can allow for the generation of steam.

In some embodiments, the solenoid S4 is configured to control and/or direct a flow of fluid to the inlet of the fluid reservoir 541 or back to the pump P1. In the default mode, the solenoid S4 can be configured to direct a flow of to the inlet of the fluid reservoir 541. In some instances, circulating the flow of fluid through the fluid reservoir 541 can facilitate the purging of air from the fluid circulation system 540. When the solenoid S4 is activated, the solenoid S4 can direct the flow of fluid to the pump, which in some instances can result in a higher efficiency in heating and/or cooling than when the fluid is routed through the fluid reservoir 541.

In some embodiments, the solenoid S5 can be configured to control and/or direct a flow of fluid to or from the fluid heater 549. For example, in the default mode, the solenoid S4 allows fluid to flow from the pump P1 to the fluid heater 549 (e.g., as part of the normal circulation). As described above, however, when the solenoid S5 is activated in conjunction with the solenoid S3, a volume of fluid can be block inside the fluid heater 549, which allows for the generation of steam. Moreover, the solenoid S5 can be activated to direct the steam to a steam outlet 528. As described above, although not shown in FIGS. 12-21, in some embodiments, the second zone 516 can include the steam outlet 528, which can be used to convey a volume of steam into the food container 535B (e.g., containing one or more vegetables).

In some embodiments, the solenoid S6 can be configured to work in conjunction with the solenoids S1 and/or S2 to control and/or direct a fluid flow to and/or from at least one to the first zone 515 and/or the second zone 516. In some embodiments, the default mode can route a flow of fluid exiting the circulation volumes 526B and/or 527B of the second zone 516 back to the solenoid S1, and thus into the circulation volumes 526B and/or 527B. As described above, the solenoid S6 can be activated in concert with the solenoids S1 and S2 to direct the flow of fluid to or from the first zone 515 and/or the second zone 516 which can, for example, allow for independent heating or cooling of the first zone 515 and/or the second zone 516.

In some embodiments, the solenoid S7 can be configured to control and/or direct a flow of fluid to the fluid heater 549. In the default mode, the solenoid S7 can work in concert with the solenoid S5 and S3 to direct a flow of fluid from the pump P and through the fluid heater 549 during, for example, normal circulation. In some instances, the solenoid S7 can be activated to control and/or direct the flow of fluid from the pump P1 such that the flow bypasses the fluid heater 549 (e.g., the fluid flows from the solenoid S7 to the solenoid S3 without passing through the fluid heater 549.

In some instances, the diagram shown in FIG. 22 can describe an example of how to route fluid through a fluid circulation system to allow a device to function in a manner similar to that described above with reference to the device 500. Accordingly, the fluid circulation system 540 shown in the diagram of FIG. 22 can enable the device 500 described above with reference to FIGS. 12-21 to at least semi-autonomously store and/or cook one or more food items.

Referring now to FIG. 23, a flowchart is shown illustrating a method 10 of using an at least semi-autonomous storage and/or cooking device according to an embodiment. The storage and/or cooking device (also referred to herein as "device") can be substantially similar in form and/or function to any of those described herein. Moreover, the device can be substantially similar to and/or can include one or more portions that are substantially similar to the devices described in the '383 publication, the '750 publication, and/or the '819 application incorporated by reference above. Accordingly, the device is not described in further detail herein.

The method 10 includes disposing at least one of a first food item in a first thermal container, a second food item in a second thermal container, and a third food item in a third thermal container, at 11. In some embodiments, the food items can be any suitable pre-packaged or loose food items. More particularly, in some instances, the first food item can be a meat or protein, the second food item can be one or more vegetables, and the third food item can be a starch or carbohydrate such as, for example, pasta.

The thermal containers can be similar to any of those described herein. For example, in some embodiments, the thermal containers can be similar to those described above with reference to the device 500. In some embodiments, for example, a thermal container can be collectively formed by and/or can otherwise include a food container and a portion of a circulation pan or the like. In other embodiments, a thermal container can be formed by and/or can otherwise include only a food container. In still other embodiments, a thermal container can define a volume configured to receive a food package or cartridge and a volume of fluid, such as those described in, for example, the '383 publication. In other embodiments, the thermal containers can have any suitable shape size, and/or configuration.

A first volume of fluid circulating through a portion of the first thermal container and a portion of the second thermal container is cooled such that thermal energy from at least the first food item and the second food item is transferred to the cooled fluid, at 12. For example, in some embodiments, the device can be in a first operating mode (e.g., a storage mode) in which the device keeps a temperature of the food items below a threshold temperature. In some embodiments, the device includes a fluid circulation system that can be configured to circulate the first volume of fluid. Moreover, in some embodiments, a thermal container can define one or more circulation volumes configured to receive the circulating cooled fluid. In some embodiments, the fluid can be in physical contact with an outer surface of a food container or the like. In other embodiments, a wall or structure of a circulating pan that defines the circulation volumes can be in physical and/or at least thermal contact with the food container and/or the food item(s). As described above with reference to FIG. 22, in some embodiments, a controller of the device can be configured to control one or more solenoids, pumps, cooling elements, fluid heaters and/or the like such that the cooled fluid is circulated through the fluid circulation system the portions of the first and second thermal containers.

In response to a first criterion being satisfied, the first volume of fluid circulating through the portion of the first thermal container and the portion of the second thermal container is heated such that thermal energy from the heated fluid is transferred to the first food item and the second food item, at 13. For example, in some embodiments, the controller of the device can be configured to execute one or more processes and/or the like operable to transition the device from the first operating mode to a second operating mode (e.g., a cooking mode) in which the device cooks the food items at or to a desired temperature and for a desired time. As described above, in some embodiments, the criterion can be, for example, based on a scheduled cooking time and/or a scheduled time at which a user would like to eat the cooked food items. In other embodiments, the criterion can be, for example, an input provided by a user (e.g., a direct input via a user interface of the controller and/or an indirect input via a remote device such as a mobile device, smartphone, tablet, computer, smart home digital assistant, etc.).

As described in detail above, the device can be configured to circulate the heated fluid through one or more portions of the device to cook the food items disposed therein when the device is placed in the second operating mode. In some embodiments, the fluid circulation system and/or the controller can be configured to transition and/or activate one or more solenoids and/or pumps such that the heated fluid is routed, conveyed, and/or circulated into the portions of the thermal containers (e.g., one or more circulation volumes as described above with reference to the device 500 shown in FIGS. 12-21 and the routing diagram shown in FIG. 22). As described above with reference to the devices 100, 200, 400, and/or 500, the heated fluid circulating through the portions of the thermal containers can have a predetermined and/or desired temperature that is at least partially based on the food items disposed therein. Accordingly, the device can be configured to cook the first food item and the second food item at or to a desired temperature and for a desired time. Moreover, as described above with reference to the device 500, the device can be configured to cook the first food item and the second food item via different modalities or via the same modalities based at least in part on information associated with the first food item and the second food item.

In response to a second criterion being satisfied, a second volume of fluid is conveyed into a portion of the third thermal container such that thermal energy from the second volume of fluid is transferred to the third food item, at 14. For example, in some embodiments, the second criterion can be based on a predetermined cooking time for at least one of the first food item, the second food item, and/or the third food item. In other instances, the second criterion can be associated with a desired time at which the third food item will be fully cooked. In still other embodiments, the second criterion can be associated with a user input, as described above with reference to the first criterion.

As described in detail above with reference to the device 500, the device can be configured to convey a volume of heated fluid into at least a portion of the third thermal container (which in this example can be similar to the food container 536). In some embodiments, the volume of fluid can be sufficient to substantially submerge the third food item disposed therein but can be insufficient to trigger and/or initiate a siphon included in and/or coupled to the third thermal container (food container), as described above with reference to the food container 536. In some embodiments, the heated fluid can have a temperature at or near a boiling temperature of the fluid (e.g., about 212° F. for water). In other embodiments, the heated fluid can have a temperature below the boiling temperature of the fluid. In such embodiments, the device can include a heating element (e.g., similar to the heating element 561) configured to transfer thermal energy to the second volume of fluid disposed in the portion of the third thermal container. In some instances, such a heating element can be configured to heat the second volume of fluid to a temperature near, at, or above the boiling temperature of the fluid.

In some instances, once the third food item has been cooked a desired amount, the device can be configured to convey an additional volume of fluid into the third thermal container. In some instances, the additional volume can be such that the total volume of fluid in the third thermal container exceeds a threshold volume of fluid. In such instances, exceeding the threshold volume of fluid can initiate and/or trigger a siphon of the third thermal container, as described in detail above with reference to the food container 536. Accordingly, the device can be configured to cook the third food item a desired amount and then can be configured to initiate and/or trigger the siphon of the third thermal container such that the volume of fluid is drained from the portion of the third thermal container.

As described above, in some instances, the device can be configured to cook the first food item, the second food item, and/or the third food item according to instructions associated with those food items. In some embodiments, the device can be configured such that the cooking of the food items is finished at substantially the same time. Moreover, in some embodiments, the device can include one or more additional elements, components, and/or features configured to transfer thermal energy to at least one of the first food item, the second food item, and/or the third food item. For example, in some embodiments, the first thermal container and the second thermal container can include and/or can be coupled to one or more heating elements that can be configured to transfer thermal energy to the first and second food items, respectively, as described in detail above with reference to the heating element 560.

In some embodiments, a user can, for example, subscribe to a meal delivery service in which the user selects the food items he or she wishes to eat (e.g., via a PC application, mobile application, web browser and the Internet, telephone service, etc.) and receives the food items via a delivery. In such embodiments, the food items and/or meals can be pre-packaged prior to delivery. In this manner, the user can receive the food items and can place them within the device 100 and/or 200 without having to place the food items, for example, in freeze storage or the like. Such subscription services can be based on, for example, a desired number of meals per week and/or any other suitable measure. In other instances, a user can purchase one or more meals "on demand." For example, a user can enter an order via the Internet and a web browser, PC or mobile application, etc.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals (e.g., propagating electromagnetic wave carrying information on a transmission medium such as space or a cable). The media and computer code (also referred to herein as code) may be those designed and constructed for the specific purpose or purposes. Examples of non-transitory computer-readable media include, but are not limited to: magnetic storage media such as hard disks, optical storage media such as Compact Disc/Digital Video Discs (CD/DVDs), Compact Disc-Read Only Memories (CD-ROMs), magneto-optical storage media such as optical disks, carrier wave signal processing modules, and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.), or other programming languages and/or other development tools. Additional examples of computer code include, but are not limited to, control signals, encrypted code, and compressed code.

While some of the electronics systems are described herein as receiving signals from any suitable sensor and/or the like and based on a processor executing a set of instructions, a subsequent action is performed by a portion of the device, in other instances, a signal from the sensor can be operable in causing a portion of the device to perform the subsequent action. For example, in some instances, the signal sent from a sensor can be operable in transitioning a switch, a fuse, a breaker, and/or any other suitable logic device from a first state, in which a portion of the device receives a flow of electric power, to a second state, in which the portion of the device substantially does not receive a flow of electric power or vice versa. For example, a sensor can send a signal based on a temperature of a volume of fluid contained in a thermal container exceeding a predetermined threshold that can be operable in opening or closing one more valves configured to control a flow fluid into and/or out of the thermal container to bring the temperature of the volume of fluid within the predetermined threshold. Similarly, a fill sensor or the like can send a signal based on a fill level of a volume of fluid contained in the thermal container exceeding a predetermined fill limit that can be operable in opening one or more valves to establish fluid communication between a volume defined by the thermal container and a drain reservoir. As such, at least a portion of the fluid can be drained from the thermal container until the volume of the fluid is within the predetermined fill limit.

While various embodiments have been described above, it should be understood that they have been presented by way of example only, and not limitation. Where schematics and/or embodiments described above indicate certain components arranged in certain orientations, positions, and/or configurations, the arrangement of components may be modified. While the embodiments have been particularly shown and described, it will be understood that various changes in form and details may be made. Similarly, although various embodiments have been described as having particular features and/or combinations of components, other embodiments are possible having a combination of any features and/or components from any of embodiments as discussed above.

For example, while one or more of the circulation pans 420 are described herein with reference to FIGS. 8-11 as defining a volume that receives a flow of fluid such that the fluid is in contact with an outer surface of the food package 435 disposed therein, in some embodiments, one or more of the circulation pans 420 can have any suitable configuration while providing a similar function or substantially the same function. For example, in some embodiments, the device 400 can include a series of coils or the like that are in contact with the outer surface of one or more of the food packages 435 and through which the fluid circulation system can provide a flow of cooled or heated fluid (e.g., water). In other embodiments, the device 400 can include one or more circulation pans similar to the circulation pans 520 described with reference to the device 500. In such embodiments, for example, a volume of fluid can be used to cool or heat one or more surfaces of a circulation pan, which in turn, can be in contact with an outer surface of the food package or container. In still other embodiments, the volume of fluid circulating into and/or through a circulation pan can cool and/or heat a cavity or the like in which the food package and/or container is disposed.

Although some of the containers, packages, and/or cartridges containing the food are not particularly shown and/or described herein, it should be understood that such packages and/or cartridges can have any suitable arrangement and/or configuration. In some embodiments, for example, the packages can contain meat and/or other protein products in a first fluidically sealed portion and can contain vegetables, starches, carbohydrates, etc. in one or more sealed or unsealed portions. In some embodiments, the packages and/or cartridges can include an absorbent material or the like configured to absorb excess fluid resulting from the cooking of the food. In some embodiments, the packages and/or cartridges can be substantially similar to any of those described in the '750 publication and/or the '819 application. In other embodiments, food items can be positioned within a device (e.g., the device 100, 200, 300, and/or 400) without being disposed in a package, cartridge, and/or the like. For example, in some embodiments, one or more loose food items can be positioned in a thermal container and/or circulation pan. In other embodiments, one or more loose food items can be at least temporarily disposed in or on a tray, a carrier, a pan, and/or any other suitable holding device configured for use within the devices 100, 200, 300, and/or 400. Thus, while specific examples of food packaging have been presented herein, it should be understood that such food packaging is presented by way of example only and not limitation. The devices 100, 200, 300, and/or 400 described herein can be configured to store and/or cook food items disposed in any suitable packaging or the like or can be configured to store and/or cook unpackaged or loose food items.

Where methods and/or schematics described above indicate certain events and/or flow patterns occurring in certain order, the ordering of certain events and/or flow patterns may be modified. Additionally, certain events may be performed concurrently in parallel processes when possible, as well as performed sequentially. For example, as described above with reference to the device 500, a device such as those described herein can be configured to cook one or more food items in an at least partially parallel process such that the cooking of each food item is finished at substantially the same time despite starting at different times. It should be understood that the methods of operation and/or use described herein are provided by way of example and not limitation. Moreover, it should be understood that while specific examples of cooling and/or heating (cooking) food items are described herein, the operation of the device (e.g., storing and/or cooking food items) is not intended to be limited thereto.

What is claimed:

1. A method, comprising:
 inserting a food container having a food item disposed therein into an inner volume of a thermal container, the thermal container being disposed within a housing of a countertop storage and cooking device;
 conveying fluid into the food container via an inlet disposed in the inner volume of the thermal container and after inserting the food container in the inner volume, the fluid being heated by the first heating element prior to being conveyed to the food container;
 cooling a volume of liquid circulating through a liquid jacket disposed in the housing and at least partially surrounding the inner volume of the thermal container such that thermal energy from the food item is transferred to the cooled volume of liquid, the volume of liquid circulating through the liquid jacket fluidically isolated from the inner volume;
 transferring, in response to a first criterion being satisfied, thermal energy from a first heating element to the volume of liquid circulating through the liquid jacket such that thermal energy from the heated volume of liquid is transferred to the food item, the first heating element disposed within the housing and outside of the thermal container; and
 transferring thermal energy from a second heating element different from the first heating element to the food item in response to a second criterion being satisfied, the second heating element disposed in the inner volume of the thermal container.

2. The method of claim 1, wherein the first criterion is associated with at least one of a predetermined schedule or a signal indicative of an instruction to heat the volume of liquid via the first heating element, the second criterion is associated with a predetermined cook time of the food item via the thermal energy from the heated volume of liquid circulating through the liquid jacket.

3. The method of claim 1, wherein a rate of thermal energy transfer from the heated volume of liquid circulating through the liquid jacket to the food item disposed in the inner volume of the thermal container is less than a rate of thermal energy transfer from the second heating element to the food item.

4. The method of claim 1, wherein the second heating element disposed in the inner volume of the thermal container is above the food item when the food item is disposed therein.

5. The method of claim 1, further comprising:
 supplying, in response to the second criterion being satisfied, a flow of electric power operable to energize the second heating element to transfer thermal energy to the food item disposed in the inner volume, the thermal energy transferred to the food item from the second heating element being independent of the thermal energy transferred from the heated volume of liquid to the food item.

6. The method of claim 1, wherein the thermal container includes a set of walls, a first surface of each wall from the set of walls collectively define at least a portion of the inner volume of the thermal container, a second surface of each wall from the set of walls collectively define at least a portion of the liquid jacket, the second surface of each wall from the set of walls is opposite the first surface of that wall from the set of walls.

7. The method of claim 1, wherein the second heating element is a broiler element configured to transfer thermal energy to the food item via radiant heat transfer.

8. The method of claim 1, further comprising:
 disposing the food item in the food container prior to the inserting of the food container into the inner volume of the thermal container;

the conveying of the fluid to the food container includes conveying a liquid into the food container such that the food item is submerged in the liquid, at least a portion of the thermal energy transferred from the heated volume of liquid in the liquid jacket is transferred to the liquid in the food container; and transferring thermal energy from the liquid in the food container to the food item.

9. The method of claim 8, further comprising:
draining the liquid from the food container prior to the transferring of thermal energy from the second heating element to the food item.

10. The method of claim 1, further comprising:
transferring the volume of liquid from a liquid reservoir disposed in the housing into a liquid circulation system disposed in the housing; and
circulating the volume of liquid through the liquid jacket.

11. The method of claim 1, wherein the fluid is steam.

12. A method of using a countertop storage and cooking device having a thermal container, a first heating element, and a second heating element different from the first heating element, the thermal container, the first heating element, and the second heating element disposed in a housing of the countertop storage and cooking device, the method comprising:
inserting a food container having a food item disposed therein into an inner volume of the thermal container, a water jacket disposed in the housing and surrounding the inner volume, the water jacket defining a guide that receives at least an edge portion of the food container inserted in the inner volume;
conveying fluid into the food container via an inlet disposed in the inner volume of the thermal container and after inserting the food container in the inner volume, the fluid being heated by the first heating element prior to being conveyed to the food container;
cooling a volume of water circulating through the water jacket such that thermal energy from the food item is transferred to the cooled volume of water, the volume of water circulating through the water jacket fluidically isolated from the inner volume;
heating, via the first heating element, the volume of water circulating through the water jacket such that thermal energy from the heated volume of water is transferred to the food item; and
supplying, in response to a criterion being satisfied, a flow of electric power operable to energize the second heating element to transfer thermal energy to the food item, the thermal energy from the second heating element being independent of the thermal energy from the heated volume of water.

13. The method of claim 12, wherein the heating via the first heating element is in response to at least one of a predetermined schedule or a signal indicative of an instruction to heat the volume of liquid via the first heating element.

14. The method of claim 12, wherein a rate of thermal energy transfer from the heated volume of water circulating through the water jacket to the food item is less than a rate of thermal energy transfer from the second heating element to the food item.

15. The method of claim 12, wherein the thermal container includes a set of walls, a first surface of each wall from the set of walls collectively define at least a portion of the inner volume of the thermal container, a second surface of each wall from the set of walls collectively define at least a portion of the water jacket, the second surface of each wall from the set of walls is opposite the first surface of that wall from the set of walls.

16. The method of claim 12, wherein the second heating element is a broiler element disposed in the inner volume of the thermal container and configured to transfer thermal energy to the food item via radiant heat transfer.

17. The method of claim 12, further comprising:
disposing the food item in the food container prior to the inserting of the food container in the inner volume of the thermal container;
the conveying the fluid into the food container includes conveying the fluid such that the food item is submerged in the fluid, at least a portion of the thermal energy transferred from the heated volume of water in the liquid jacket is transferred to the fluid in the food container; and
transferring thermal energy from the fluid in the food container to the food item.

18. The method of claim 12, further comprising:
automatically draining the fluid from the food container prior to the supplying of the flow of electric power operable to energize the second heating element.

19. The method of claim 12, further comprising:
transferring the volume of water from a reservoir disposed in the housing into a circulation system disposed in the housing; and
circulating the volume of liquid through the water jacket.

20. The method of claim 12, wherein the fluid is steam.

21. A countertop storage and cooking device, the device comprising:
a housing;
a thermal container disposed in the housing, the thermal container defining an inner volume configured to receive a food container having a food item disposed therein;
a liquid circulation system disposed within the housing and configured to circulate a volume of liquid through a liquid jacket disposed in the housing and at least partially surrounding the thermal container, the volume of liquid fluidically isolated from the inner volume, the liquid circulation system including:
an inlet extending through the liquid jacket such that an end portion is disposed in the inner volume, the inlet configured to convey fluid to the food container disposed in the inner volume,
a cooling element at least partially disposed in the housing and configured to cool the volume of liquid circulating through the liquid jacket when the device is in a first operating mode allowing thermal energy to be transferred from the food item to the cooled volume of liquid, and
a first heating element disposed in the housing and configured to heat the volume of liquid circulating through the liquid jacket when the device is in a second operating mode allowing thermal energy to be transferred from the heated volume of liquid to the food item; and
a second heating element disposed in the thermal container and isolated from the liquid jacket, the second heating element configured to transfer radiant energy to the food item disposed in the inner volume when the device is in a third operating mode.

22. The device of claim 21, wherein the liquid circulation system is operable in transferring thermal energy to the food item via a first energy transfer modality and the second heating element is operable in transferring radiant energy to the food item via a second energy transfer modality different from the first energy transfer modality.

23. The device of claim 21, wherein the second heating element is a broiler element.

24. The device of claim 21, wherein thermal energy is transferred from the inner volume of the thermal container to the cooled volume of liquid circulating through the liquid jacket when the device is in the first operating mode to cool the food item when the food item is disposed in the inner volume.

25. The device of claim 21, wherein thermal energy is transferred from the heated volume of liquid circulating through the liquid jacket to the inner volume of the thermal container when the device is in the second operating mode to heat the food item when the food item is disposed in the inner volume.

26. The device of claim 25, wherein the device is configured to transition from the second operating mode to the third operating mode after a predetermined amount of thermal energy is transferred from the heated volume of liquid to the food item when the food item is disposed in the inner volume.

27. The device of claim 25, wherein a rate of thermal energy transfer from the heated volume of liquid to the food item when the food item is disposed in the inner volume and the device is in the second operating mode is less than a rate of thermal energy transfer from the second heating element to the food item when the food item is disposed in the inner volume and the device is in the third operating mode.

28. The device of claim 21, wherein the thermal container includes a set of walls, a first surface of each wall from the set of walls collectively define at least a portion of the inner volume of the thermal container, a second surface of each wall from the set of walls collectively define at least a portion of the liquid jacket, the second surface of each wall from the set of walls is opposite the first surface of that wall from the set of walls, the first surface a portion of the set of walls forming a guide configured to receive at least an edge portion of the food container inserted in the inner volume.

29. The device of claim 21, wherein the liquid circulation system further includes a liquid reservoir disposed in the housing, the liquid circulation system configured to circulate the volume of liquid from the liquid reservoir through the liquid jacket.

30. The apparatus of claim 21, wherein the fluid conveyed to the food container is one of liquid water or steam.

* * * * *